(12) United States Patent
Petri et al.

(10) Patent No.: US 9,785,988 B2
(45) Date of Patent: Oct. 10, 2017

(54) IN-APPLICATION COMMERCE SYSTEM AND METHOD WITH FRAUD PREVENTION, MANAGEMENT AND CONTROL

(75) Inventors: Daniel Petri, Vienna (AT); Georg Kohout, Vienna (AT); Georg Nader, Vienna (AT); Martin Mayerhofer, Vienna (AT)

(73) Assignee: DIGITAL RIVER, INC., Minnetonka, MN (US)

( * ) Notice: Subject to any disclaimer, the term of this patent is extended or adjusted under 35 U.S.C. 154(b) by 626 days.

(21) Appl. No.: 13/304,191

(22) Filed: Nov. 23, 2011

(65) Prior Publication Data

US 2012/0130853 A1 May 24, 2012

Related U.S. Application Data

(60) Provisional application No. 61/417,063, filed on Nov. 24, 2010.

(51) Int. Cl.
*G06Q 30/00* (2012.01)
*G06Q 30/06* (2012.01)

(52) U.S. Cl.
CPC ................. *G06Q 30/0609* (2013.01)

(58) Field of Classification Search
CPC .......................................... G06Q 30/06–30/08
USPC ................................................ 705/26.1–27.2
See application file for complete search history.

(56) References Cited

U.S. PATENT DOCUMENTS

| | | | |
|---|---|---|---|
| 7,867,093 B2 | 1/2011 | Wright | |
| 8,006,087 B2 | 8/2011 | Ginter | |
| 8,051,011 B2 | 11/2011 | Luzzatto | |
| 2002/0077182 A1 | 6/2002 | Swanberg et al. | |
| 2002/0169021 A1 | 11/2002 | Urie et al. | |
| 2003/0033539 A1* | 2/2003 | Cheng | 713/200 |
| 2003/0126079 A1* | 7/2003 | Roberson et al. | 705/40 |
| 2005/0137015 A1 | 6/2005 | Rogers et al. | |
| 2006/0048211 A1* | 3/2006 | Pierson et al. | 726/3 |
| 2006/0281509 A1 | 12/2006 | Arias-Vargas et al. | |
| 2007/0060327 A1 | 3/2007 | Curtis | |

(Continued)

OTHER PUBLICATIONS

Aria Gaming Solutions, Web pages retrieved from URL:http://www.ariasystems.com. Retrieved on Nov. 22, 2011.

(Continued)

*Primary Examiner* — Ethan D Civan
(74) *Attorney, Agent, or Firm* — Lynn M. Holly; Billion & Armitage; Richard E. Billion

(57) ABSTRACT

A full-service turn-key in-application commerce solution with fraud detection is disclosed that provides web service interfaces to a commerce system. The in-application solution features fraud detection with user behavior tracking and fraud controls that limit the features that are offered to a user. Fraud detection involves input from the application, the commerce system, or third party systems. User fraud scores are updated frequently as events are processed. Controls are applied to the user account based on the user fraud score and risk classifications for ranges of fraud scores. An in-application solution also features a wallet with a personal threshold for microtransaction spending, limiting the amount that the user is allowed to spend before a wallet is cleared. The wallet is integrated with the fraud detection such that the personal threshold is determined from the user's latest fraud score.

36 Claims, 27 Drawing Sheets

(56) References Cited

U.S. PATENT DOCUMENTS

| | | |
|---|---|---|
| 2007/0072678 A1 | 3/2007 | Dagres |
| 2008/0268959 A1 | 10/2008 | Bryson et al. |
| 2008/0288382 A1* | 11/2008 | Smith et al. .................... 705/35 |
| 2009/0017886 A1 | 1/2009 | McGucken |
| 2009/0258707 A1 | 10/2009 | Boesen |
| 2010/0035689 A1 | 2/2010 | Altshuler et al. |
| 2010/0094768 A1* | 4/2010 | Miltonberger ................ 705/325 |
| 2010/0262477 A1 | 10/2010 | Hillerbrand et al. |
| 2011/0191200 A1* | 8/2011 | Bayer et al. ................. 705/26.1 |
| 2011/0208656 A1 | 8/2011 | Alba et al. |
| 2011/0218045 A1 | 9/2011 | Williams et al. |
| 2011/0230251 A1 | 9/2011 | Nicely et al. |
| 2011/0238517 A1 | 9/2011 | Ramalingam et al. |
| 2011/0238521 A1 | 9/2011 | Porat et al. |
| 2011/0265041 A1 | 10/2011 | Ganetokas et al. |
| 2011/0276417 A1 | 11/2011 | Campbell et al. |
| 2011/0276496 A1 | 11/2011 | Neville et al. |

OTHER PUBLICATIONS

Livegamer Web Pages Retrieved from URL:http://www.livegamer.com. Retrieved on Nov. 22, 2011.

PlaySpan, Inc. Web Pages. Retrieved from URL:https://developer.playspan.com. Retrieved on Nov. 22, 2011.

Vindicia Web Pages. Retrieved from URL:http://www.vindicia.com. Retrieved on Nov. 22, 2011.

Lurie, Mark, Online Gaming Frauds, https://web.archive.org/web/20111108153006/http://rsi4u.org/onlinegamingfrauds/, Oct. 1, 2010.

\* cited by examiner

2502

Define Permissions

Authorized Wallet Usage: ● true  ○ false

2504

Maximum Amount per Transaction: 9.99  Gold Coins  [Delete]

Define the amount to be charged per billing cycle  [    ]  -select- ▼  [Add]

Maximum Amount per Month:

Define the amount to be charged per billing cycle  [    ]  -select- ▼  [Add]

Manage Online Budget: ● true  ○ false

2506

Limit Usage (Hours per day) [    ]

Limit Usage for Weekend [    ]

2508

| Age Restriction: | Rate List | | Selected Supported Rates |
|---|---|---|---|
| Define for which countries this payment form should be disabled | EC (age 3-5)<br>E (age 6-9)<br>E 10+ (age 10-12)<br>T (age 13-16) | ><br><  | |

2510

Send Notification

Subject: [                                    ]

Message: [                                    ]

<<Back to Overview                                  [Create Account]

FIG. 25

IN-APPLICATION COMMERCE SYSTEM AND METHOD WITH FRAUD PREVENTION, MANAGEMENT AND CONTROL

RELATED APPLICATIONS

This application claims the benefit of U.S. Provisional Application No. 61/417,063 filed 24 Nov. 2010, entitled "In-Application Commerce System and Method," which is incorporated herein by reference.

This patent application is related to co-pending U.S. patent application Ser. No. 13/304,171, filed 23 Nov. 2011, and entitled "Modularized In-Application Commerce System and Method" which claims the benefit of U.S. Provisional Application No. 61/417,083 filed 24 Nov. 2010, entitled "Modularized In-Application E-Commerce System and Method", all of which are incorporated herein by reference.

FIELD OF THE INVENTION

The present disclosure relates to commerce systems for use in the internet gaming, social networking and virtual world industries. More particularly, the present disclosure relates to a modular in-application e-commerce system and method providing commerce services to online game publishers.

BACKGROUND OF THE INVENTION

The social gaming industry is making its contribution to the world economy. According to Parks Associates, the social gaming industry will increase its revenue by five times between 2010 and 2015, when it is expected to top $5 billion. Recently, the value of the sale of virtual goods in the online games market has been surpassed by that of social networking sites. This market expects to see an increase in value from $2.2 billion in 2009 to $6 billion before 2014. Each of these applications, which offer at least some free features, offers new opportunities for integrating e-commerce, monetization, and sales and marketing of content and products.

According to media consultant, Dan Taylor, choosing monetization strategies depends on the social game value chain, which can be summarized into 5 phases: idea, balance, goods/currency, payments and commissions. First, the game idea is the foundation of everything else that follows. Publishers with a game idea must evaluate the revenue potential of the game. Once the game has been fleshed out, the next phase of the value chain is game balancing, where game publishers define crucial monetization factors in order to fully develop the virtual economy of the game. Virtual economies function like real world economies, and therefore issues such as supply and demand, inflation, speculation, etc., must be factored in to create a pricing structure that will remain balanced and fair within the game, provide publishers with a decent return for their efforts, and remain attractive to the end user, i.e. cost vs. value. In addition to these variables, developers must also factor in limited offers and promotions that will incentivize users to either play or purchase more, while at the same time, maintaining the delicate balance of their virtual economy.

Virtual economies arise out of interactions among players in the virtual world, usually as they exchange virtual goods and earn valuable objects that provide the participant with both utility and social value. Selling virtual goods within social games has become the dominant business model on social networks because social games can support virtual goods that combine game play benefit with social value.

A virtual economy may also include reward programs. A reward program is a form of a loyalty program. Loyalty programs allow a publisher to identify their customers and reward them as a retention mechanism. An effective reward program also enables the publisher to identify potential best customers and market to them accordingly. The basic principle is that by rewarding the best customers they in turn will continue to reward you with their business as they feel recognized and appreciated. The key objective of loyalty or reward programs is to strengthen the two-way loyalty bond between the publisher and its best customers. Every time a reward program device, most commonly a "reward card" is used, it not only identifies the customer but also links relevant transactions to their record. This data can then be analyzed and used to reward customers with the objective of retaining or growing their profit contribution.

Virtual currency is typically the medium of exchange used for virtual goods. Each game typically has its own nomenclature for its virtual currency (e.g. coinz, tokenz, gcash, etc.) but they all provide a means of exchange allowing users to purchase items. Virtual currency may be purchased with real world currency or earned by obtaining various goals in the application. This exchange takes place in a virtual marketplace (primary market, or game-to-player market) or a virtual auction house (secondary market or player-to-player market).

Once the virtual economy is set, publishers need to build a bridge to "real world" money by providing a payments system. Payments services can be provided by a service provider or directly from the end user themselves. When application publishers choose to receive payment directly, there are a number of "real world" financial elements to be considered, including credit card fraud, charge backs, taxation, and much more. Publishers must manage how they'll aggregate these payments. If they have chosen a service provider to handle this for them, they may choose either a branded or white label payment service.

Commissions refer to the amount of revenue earned by the provider for their services. Commissions are highly dependent upon the title's success and associated volume, not only of active users, but also profits derived from sales of virtual goods.

Once the application publisher determines how the application will be monetized, a specific partner may be chosen to provide the monetization environment. In the social network/free-to-play gaming field, there are generally three unique forms of monetization: offer companies, payment service providers, and technology firms. Each has its own area of specialization, and game developers can mix and match from each provider. Some offer only a niche option, while others can provide a complete turn-key solution. Offer companies may provide a "bare bones" solution, in so much as they only offer one form of monetization—that which arrives via a third party. Examples of offer companies would include Offerpal, SuperRewards, Boomerang Networks, Gratispay or Sponsorpay. This form of monetization focuses only on offering special offers, say an online survey to be filled out in exchange for some form of virtual currency. Offers are an important revenue factor as it helps monetize the portion of users that are not willing to spend real money on their virtual goods and currency purchases. One side effect of employing offers as a form of monetization is that game publishers will be sending players out to a third party, thereby losing the game branded experience. Offer companies clearly brand themselves, and it's here where the actual interaction between player and the monetization business model takes place. This can be at odds with optimizing the user experience, since the buying experience in an in-application e-commerce ecosystem should be as seamless and as simple as possible. While the player should be aware of his/her purchasing capabilities at all times, he/she should only momentarily leave the game to make a purchase without ever feeling as though he/she has actually left the game. In other words, the solution should be wholly integrated into the various parts of the gaming experience. Therefore, offer companies' contribution to in-application monetization only supports a small piece of the value chain.

Payment service providers offer game and social network publishers different pieces of the value chain, but due to their nature do not completely fulfill it. Examples of payment service providers include Chase PaymentTech, NetGiro, and Global Collect. These firms offer application publishers a direct integration of payment methods, i.e. there's no sending players out to a separate location to make the transaction, and then re-routing them back into the game. By using a payment service provider, application publishers can keep players in-house and thereby potentially increase application stickiness as well as 'time on-site' or 'time in-game'. While other companies build their brand by maintaining their own identity throughout the transaction, payment service providers can offer publishers a white label solution, making the technology appear as their own, or remain self-branded. These payment service providers typically are specialized financial transaction experts. Similarly offer companies are strong in the ad-broker business, and offer application publishers only a part of the value chain but do not complete it.

Some software application publishers choose to work with technology providers, such as Playspan, Live Gamer and fatfoogoo. While each of these providers have their own unique set of solutions, essentially, they allow application publishers to do what they do best—develop applications. Technology companies provide publishers with a service that addresses each piece of the value chain. Many of these companies have relationships with selected payment service providers, thereby ensuring financial excellence, as well as offering solutions for game balancing, virtual goods/items store management, virtual currency wallets, detailed analytics and reporting features, and user management. Technology providers free up application publishers to focus on application development, marketing, and balancing their application as it grows with the provided tools.

Like any online merchant, game and other application publishers are especially concerned about limiting their exposure to fraud while offering their players and users the richest, most exciting game experience possible. Online fraud, particularly in the gaming area, comes in many forms, including software piracy, theft of passwords and inventory owned by/assigned to user accounts and payment/commerce related fraud.

A need exists for a system that offers an extensive and comprehensive monetization feature set with optimal fraud detection and management features. Examples of desirable features include detecting, preventing and mitigating fraud, managing the game economy, offering flexible payment methods (e.g. payment using both virtual and real currency from one account) and reverse wallet transactions that offer the greatest protections for the game/application publisher. The present invention provides a solution to these needs and other problems, and offers other advantages over the prior art.

BRIEF SUMMARY

In accordance with one embodiment of the invention, a comprehensive, turn-key, in-application ecommerce system and method is disclosed. Such an in-application ecommerce solution provides functionality for operations ideally suited for the social gaming and network environment, for example, it provides software modules and application programming interfaces (API) configured as web services for monetizing in-application activities such as user account management, fraud detection, wallets, and transaction and payment processing. This functionality can be described from the perspective of operational areas of billing and customer management, store and primary markets, and player-to player (i.e., secondary markets). A preferred embodiment of the present invention provides this functionality in a highly modularized manner such that software application publishers may subscribe to the entire set of features and functionality, or may choose any number and combination of modules that best suits the software application.

Billing and customer management features of the solution span a wide variety of functionality required to support a fully integrated in-application monetization solution. Software application modules that support this functionality include account (e.g. user and subscription) management, customer care, clearing and settlement, fraud prevention, reporting and analytics, messaging, invoicing, tax and global payments. This in-application monetization solution allows users (shoppers) to store their billing related details (e.g., billing address, preferred payment method and details, transaction history) This account profile may also include information like achievements in the game or levels attained. This account enables 1 click/instant checkout or purchase experiences through multiple channels (e.g., online, mobile, tv, etc.). One skilled in the art will recognize upon examining this specification and drawings that additional modules may be included, or that functionality contained in one module may be implemented in another module and still remain within the teachings of the invention.

For the store and primary markets, the features of the preferred embodiment solution span many functional requirements. For example, an application content manager may control the behavior of items through various economic situations such as inflation, artificial scarcity and speculation by creating events that control the item attributes. In addition, a wallet feature allows the user of the software application to pay for items with either virtual currency or real currency (e.g., a credit card) stored in the same account. Player-to-player trading is accommodated by providing roles and a framework for selling and auctioning items from a user's account-based storefront.

Fraud detection and management offers the game or application publisher risk management features that protect them from chargebacks and other losses. Fraud management is based on rules configured by the customer (i.e., the software publisher), user behavior tracking and fraud controls that allow the customer to limit the features, such as payment methods, user roles, offers and content, that are offered to a user based on a user's fraud score, thereby greatly minimizing the opportunity for fraudulent behavior for users with high fraud scores. Fraud detection modules may receive input from the customer/publisher regarding which events to utilize in generating a fraud score. These utilized events may come from the application, the commerce system, or third-party systems. User fraud scores are updated frequently as events are processed by the e-commerce solution. Controls are applied to the user based on the user fraud score and customer-defined risk classifications.

An embodiment of the in-application e-commerce solution invention also features a wallet with a personal threshold for microtransaction spending, limiting the amount that the user is allowed to spend before the system clears the wallet. The wallet is tightly integrated with the fraud detection system and the personal threshold is determined from the user's latest fraud score, allowing microtransactions while limiting the risk of loss to the game or application publisher.

Additional advantages and features of the invention will be set forth in part in the description which follows, and in part, will become apparent to those skilled in the art upon examination of the following or may be learned by practice of the invention.

BRIEF DESCRIPTION OF THE DRAWINGS

FIG. 25 is a screen mockup for assigning permissions to a child account.

DETAILED DESCRIPTION

Figure 1:
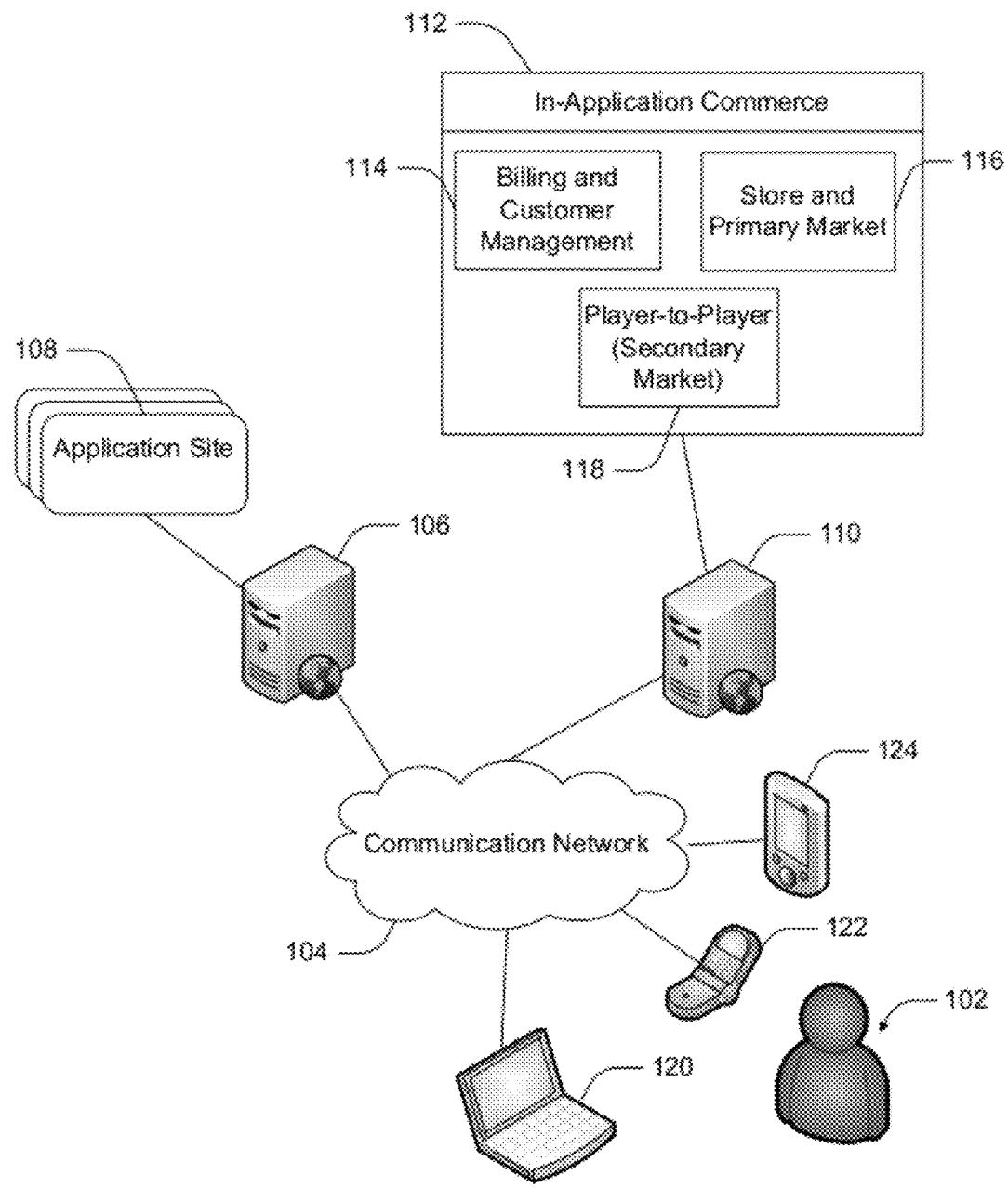
FIG. 1 illustrates an in-application commerce system in context.

An exemplary system is illustrated in context in FIG. 1. Application users 102, principally those who participate in online games, social networks and virtual worlds 108, access their favorite sites over the internet 104 via an electronic device with internet capabilities. Such an electronic device could be a computing device, such as a personal computer 120, iPad, cell phone 122, personal digital assistant 124 (PDA) or any other device with internet capability. Online games, social networks and virtual worlds 108 have become a huge source of revenue, with participants of even "free" online games spending millions of dollars each year on both virtual and real products. Participants in these applications frequently want to enhance their enjoyment of the experience by purchasing virtual objects that help them achieve a particular standing in the environment, or allow them to achieve some advantage over other participants. For example, a game player may wish to purchase an object, such as a virtual tool or weapon that allows the player to defeat other players in game activities. The application publisher may host its own commerce system allowing participants to purchase virtual or physical objects, or it may wish to access one or more modules of third-party systems. A fully developed ecommerce system 112 may include any number of modules to facilitate such transactions, for instance, modules executing code to perform the functions and features of billing and customer management 114, store and primary market management 116, and player-to-player, or secondary market 118, management.

This exemplary system includes various computers, computing devices or electronic devices, including, for example, end user machines (e.g. personal computer, etc.) 120, 122, 124, a communication network 104 and one or more servers 106, 110 hosting web sites and applications. The computer, computing or electronic device typically includes a memory, a secondary storage device, a processor (central processing unit, or CPU), an input device, a display device, and an output device. The memory may include random access memory (RAM) or similar types of memory. Software applications, stored in the memory or secondary storage for execution by a processor are operatively configured to perform the operations of a preferred embodiment of the system. The software applications may correspond with a single module or any number of modules. Modules are program code or instructions for controlling a computer processor to perform a particular method to implement the features or operations of the system. The modules may also be implemented using program products or a combination of software and specialized hardware components. In addition, the modules may be executed on multiple processors for processing a large number of transactions, if necessary or desired.

The secondary storage device may include a hard disk drive, floppy disk drive, CD-ROM drive, DVD-ROM drive, or other types of non-volatile data storage, and may correspond with the various equipment and modules shown in the figures. The processor may execute the software applications or programs either stored in memory or secondary storage or received from the Internet or other network. The input device may include any device for entering information into computer, such as a keyboard, joy-stick, cursor-control device, or touch-screen. The display device may include any type of device for presenting visual information such as, for example, a computer monitor or flat-screen display. The output device may include any type of device for presenting a hard copy of information, such as a printer, and other types of output devices include speakers or any device for providing information in audio form.

Although the computer or computing device has been described with various components, one skilled in the art will appreciate that such a computer or computing device can contain additional or different components and configurations. In addition, although aspects of an implementation consistent with the system disclosed are described as being stored in memory, one skilled in the art will appreciate that these aspects can also be stored on or read from other types of computer program products or computer-readable media, such as secondary storage devices, including hard disks, floppy disks, or CD-ROM; a non-transitory carrier wave from the Internet or other network; or other forms of RAM or ROM. One skilled in the art would recognize that computational resources may be distributed, and computing devices may be client or server computers. Client computers and devices (e.g. 120, 122, or 124) are those used by end users to access information from a server over a network, such as the Internet 104. Servers are understood to be those computing devices 106, 110 that provide services to other machines, and may be (but are not required to be) dedicated to hosting applications or content to be accessed by any number of client computers. Web servers, application servers and data storage servers may be hosted on the same or different machines 106, 110.

Client computers access features of the system described herein using Web Services. Web services are self-contained, modular business applications that have open, Internet-oriented, standards-based interfaces. According to W3C, the World Wide Web Consortium, a web service is a software system "designed to support interoperable machine-to-machine interaction over a network. It has an interface described in a machine-processable format (specifically web service definition language or WSDL). Other systems interact with the web service in a manner prescribed by its description using Simple Object Access Protocol (SOAP) messages, typically conveyed using hypertext transfer protocol (HTTP) with an Extensible Markup Language (XML) serialization in conjunction with other web-related standards." Web services are similar to components that can be integrated into more complex distributed applications.

While the system disclosed herein is described in the context of internet gaming, social networking and virtual world applications (collectively referred to as social games), it will be recognized by those skilled in the art that it may be used with other applications as well. Further, while specific modules are described, other modules may be added or deleted without departing from the scope and spirit of the present invention. All examples are offered by way of example and not limitation. It will be understood by those of ordinary skill in the art that the terms "shopper," "user," "end user" and "player" are synonymous and are used interchangeably throughout this document, while the terms "customer," "game publisher," "publisher," "administrator" or "administrative user" are also used synonymously and interchangeably.

System Components

Figure 2:
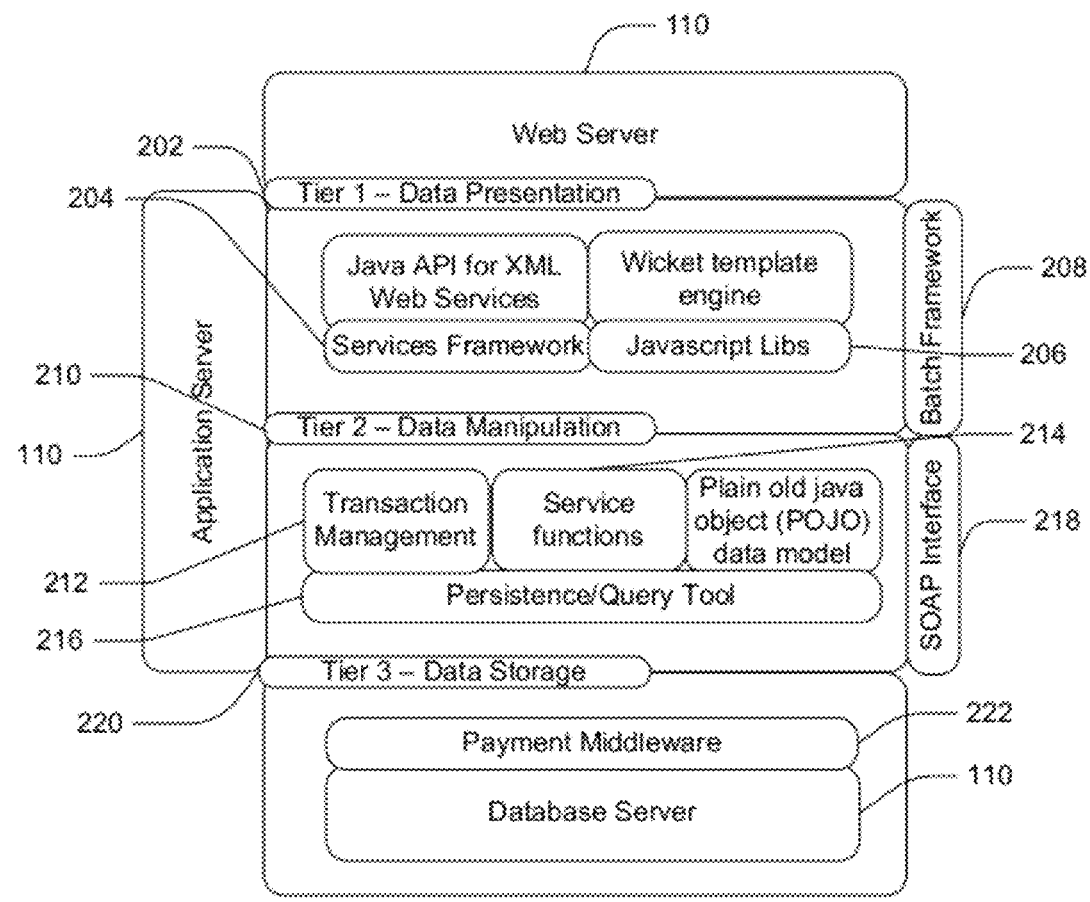
FIG. 2 illustrates the system service architecture of a modularized in-application commerce system.

FIG. 2 illustrates an exemplary three-tiered architecture of the of the system components. The data presentation layer 202 is accessed by a web server 110, stored on an application server 110 and is primarily comprised of the web services framework 204, Javascript libraries 206, display frameworks and tools, and a batch processing framework 208. The data manipulation layer 210 is primarily comprised of transaction management modules 212 for providing business rules and manipulation logic, web services functions 214 and the SOAP interface 218, the web services framework. A persistence/query tool 216 provides data storage and retrieval functions. The data storage layer 220 is primarily comprised of the system database on a database server 110 and payment middleware 222. The payment middleware 222 is an open interface that supports payment connections to billing partners, such as Paypal, mobile payments, credit card institutes, mpay24, prepaid debit cards and gift card providers and others. It will be appreciated by those skilled in the art that these server functions of web, application and database functionality may be perform by one or more physical devices (i.e., server platforms) working together to provide/serve this functionality to client devices and software applications.

Figure 3:
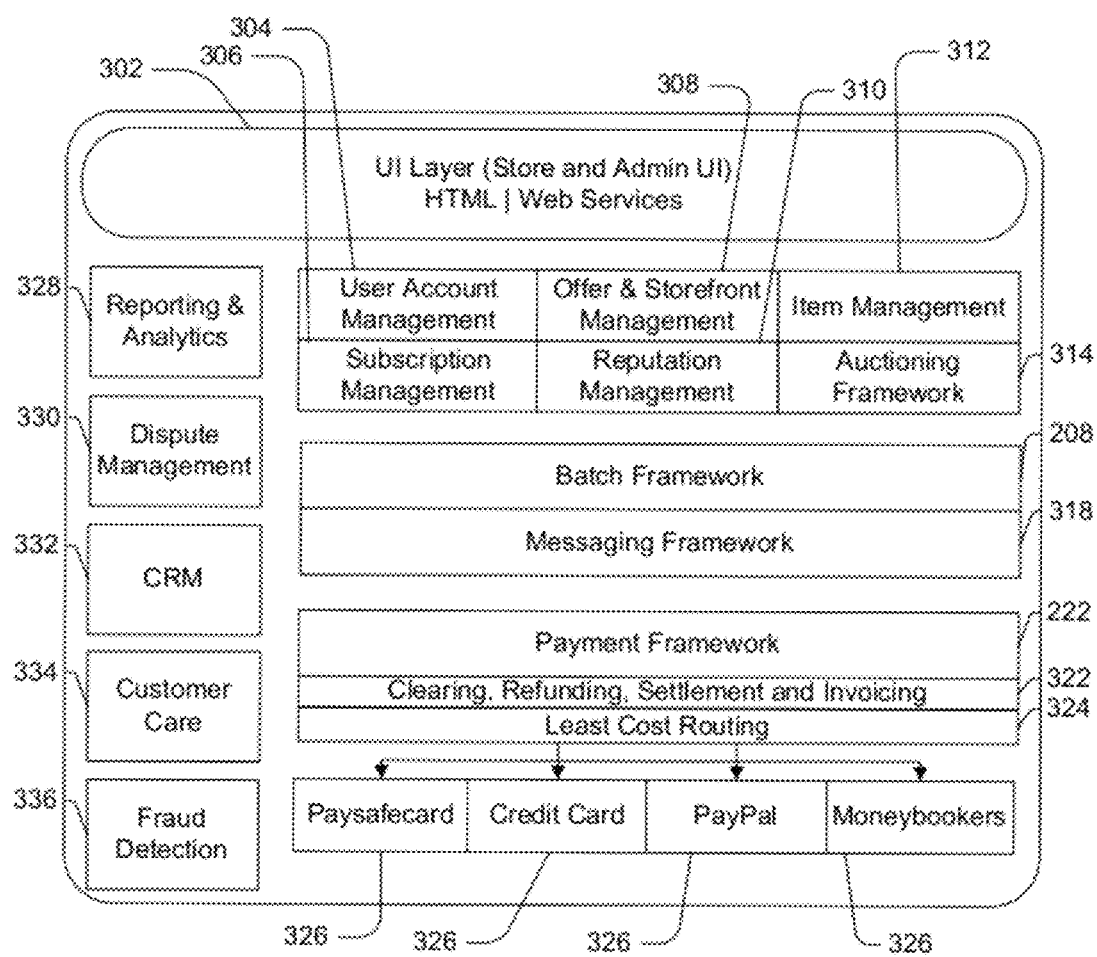
FIG. 3 illustrates the software architecture for a modularized in-application commerce solution.

The three tier structure can also be viewed from a functional perspective, as in FIG. 3. A user interface (UI) layer 302 is exposed to clients and client systems. A store and administrative user interface 302 provides user access to the system for the various administrative tasks associated with the functional modules provided. For example, an administrative user may log into the UI to set up an item or offer, run reports, perform dispute resolution and conduct analysis on offers and users. These examples are offered by way of example and not limitation. One skilled in the art would recognize that many types of functionality could be provided for an application publisher, system administrator or others to perform through a user interface without departing from the scope and spirit of the present invention.

A functional, transaction management layer provides the code required to perform the transactions and store, maintain, access and retrieve data. Also by way of example, these various modules may include user account management 304, subscription management 306, offer and store management 308, item management 312, reputation management 310, an auctioning framework for player-to-player secondary markets 314, reporting & analytics 328, dispute management 330, customer relationship management 332, customer care 334, fraud detection 336, and Clearing, Refunding, Settlement and Invoicing modules 322. A least cost router 324 in part determines the payment forms offered to a particular customer based on a number of factors. The least cost router 324 is discussed in more detail below.

A batch framework 208 supports batch processing of transaction data to provide information to supporting modules, including fraud detection analysis 336, reporting and analytics 328 and customer relationship management 332. A messaging framework 318 supports notification and communications such as email notifications to users acknowledging a purchase. Payment partners 326 are accessed and respond via the open interface middleware discussed above.

The system is designed to support three overarching areas of functionality, namely: billing and subscription management 114; electronic storefront or a primary market 116; and player-to-player trading or a secondary market 118. Application programming interfaces (APIs) provide seamless integration between the system and client applications to enable this functionality. Configuration and set up of this functionality may be accomplished either through APIs or a web client. Each of the areas of functionality, and a preferred embodiment set of modules as well as frameworks are discussed in detail below.

Billing and Subscription Management Components

Figure 4A:
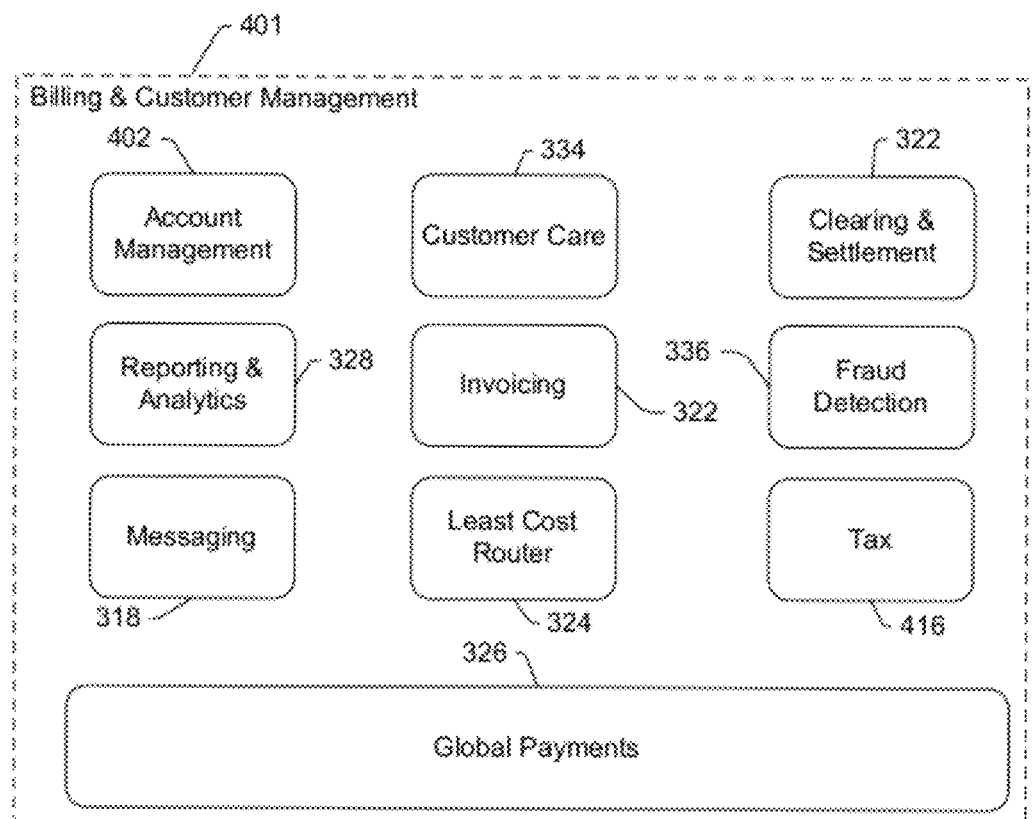
FIGS. 4a-4d illustrate some use cases supported by the in-application commerce solution.
Figure 4B:
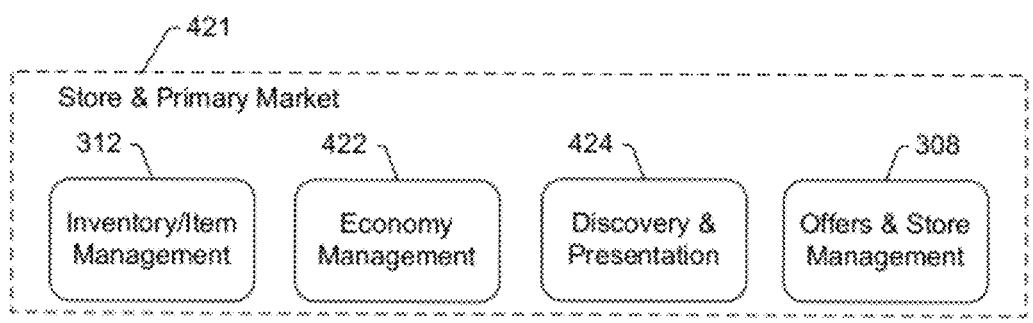

As is illustrated in FIG. 4a, modules that may support the billing and subscription management functionality include account management (user and subscription management) 402, customer care 332, clearing and settlement 322, fraud detection 336, reporting and analytics 328, messaging 318, invoicing 322, least cost routing 324, tax 416 and global payments 326.

Account Management Module

An account management module 402 allows game publishers to manage customer lifecycles, including all aspects of billing-relevant characteristics. The system provides a web-based registration process that can be seamlessly integrated with an existing web framework or can be operated on a stand-alone basis. Single sign on adapters allow the registration logic to be embedded in an existing user or community site. This module may use a role-based philosophy, with the defined roles granting a user specific access rights within the application. These functions enable an administrator to review and amend user details as well as activate/deactivate users; view/modify customer profiles; view/modify risk profiles; manage/modify active subscriptions; view customer's action history; contact the customer and more. An Account web-service described in the Web Services section below, provides access to all of the user management functions remotely. These functions can also be exposed to a user with a comprehensive graphical web-user interface.

Figure 5:
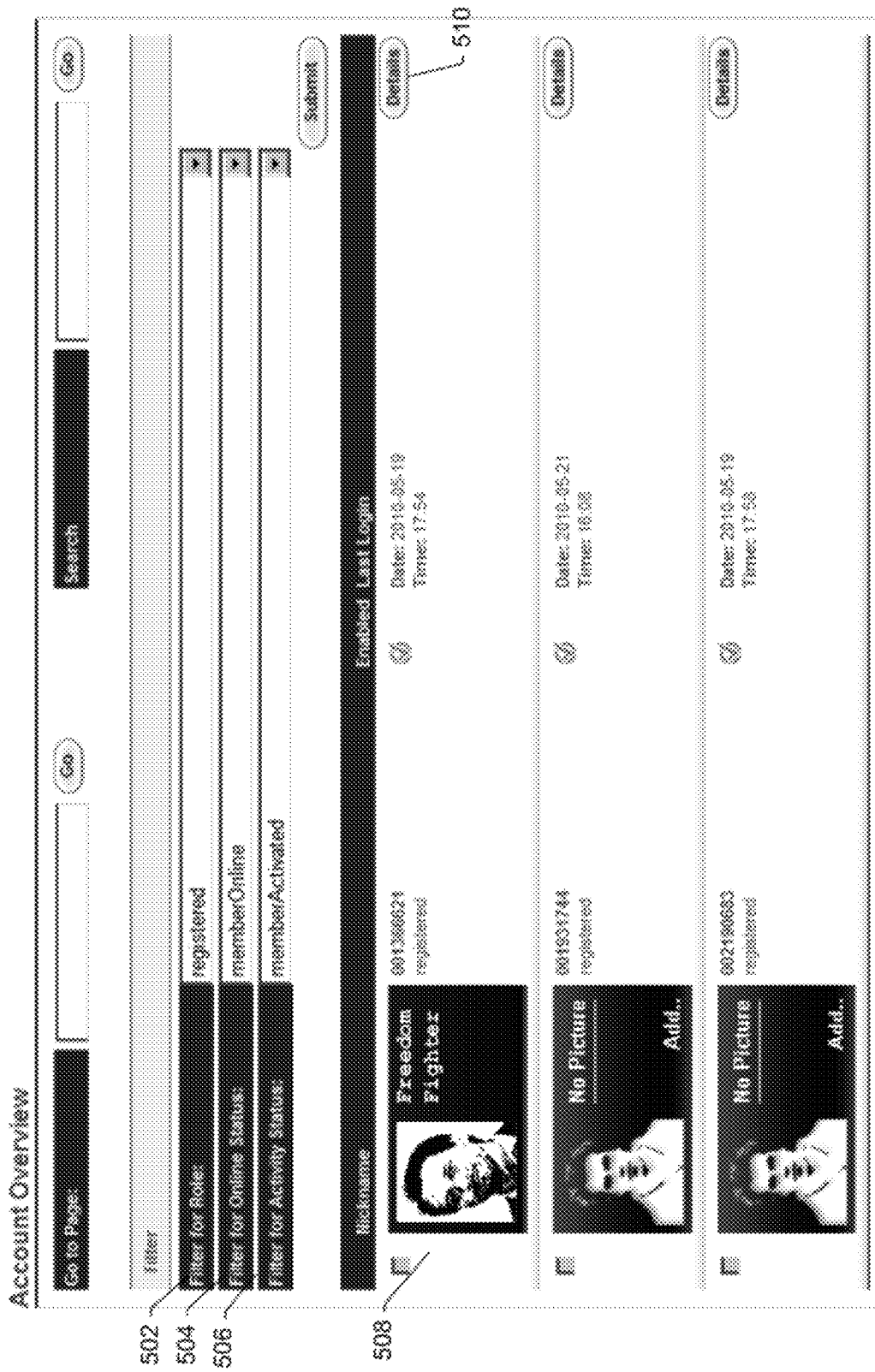
FIG. 5 is a screen shot of a User Management module, Account Overview page from the web client application.

A screen shot of the Account Overview page of the graphical web user interface is displayed in FIG. 5. The account overview page provides status information on each role created under the account. Roles may be displayed based on user-determined criteria such as role 502, online status 504 and activity status 506. Account detail pages for a particular role 508 may be opened by clicking a "Details" button 510.

Figure 6:
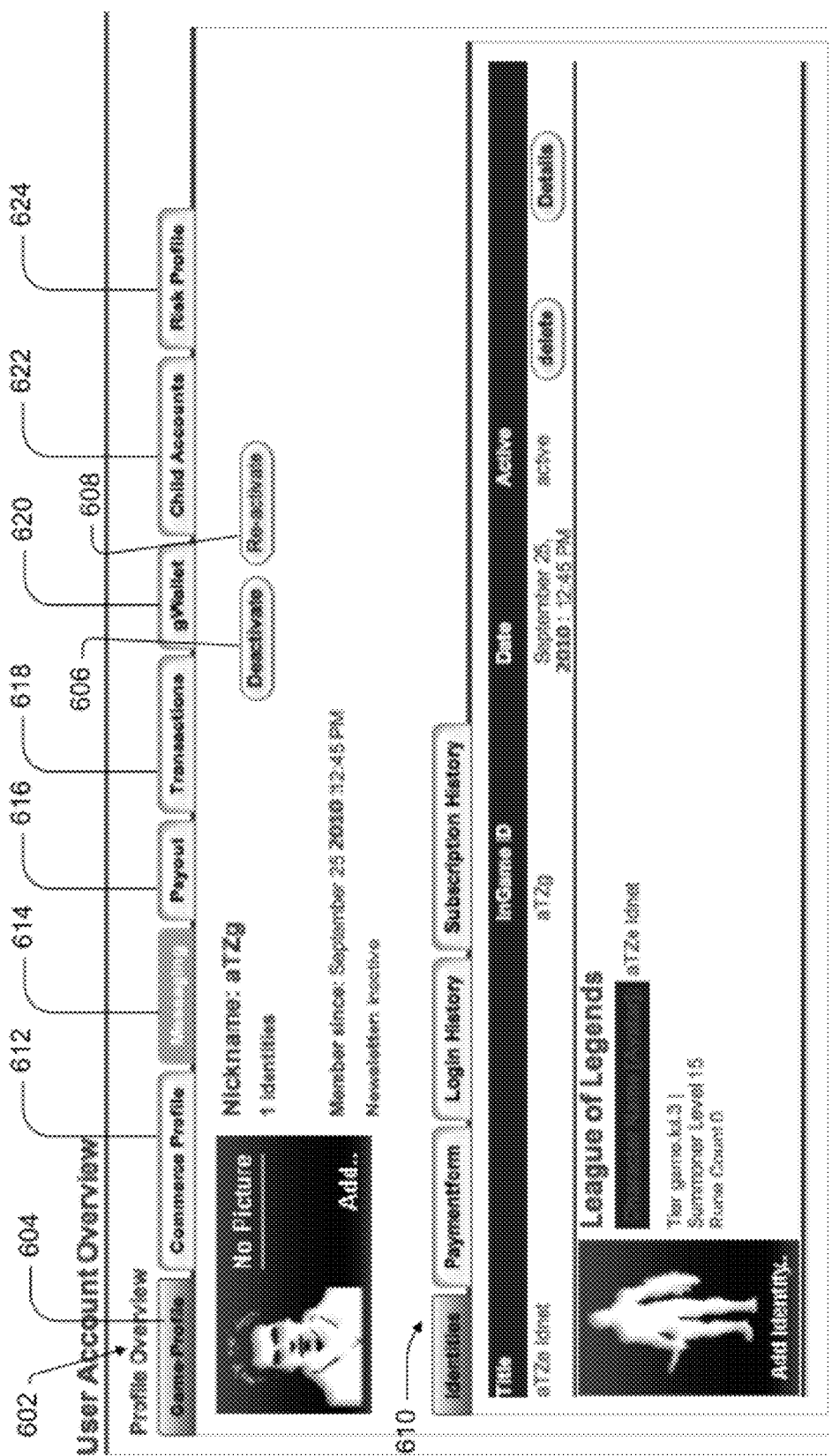
FIG. 6 is a screen shot of a User Account Overview details page, showing the various tabbed sections containing the user's account information.

Referring to FIG. 6, an User Account Overview page 602 displays a number of tabs providing profile information for the role selected. A game profile tab 604 allows an application administrator to deactivate 606 and reactivate 608 users, and view identities, payment forms, login and subscription history 610. A commerce profile 612 allows the administrator to edit and add an address to a selected user, and view their rating details and risk class (discussed below). This profile contains details on settings, payment forms, login history, role, rating details and buyer, and more. A messaging tab 614 comprises an inbox, trash, compose and sent mail folders that allow the user to send and receive messages. A payout tab 616 provides details on player-to-player trading transactions. A disputes tab (not shown) lists the user's disputes for allowing an administrator to manually evaluate disputes and risk characteristics. A transactions tab 618 provides a comprehensive list of transactions involving the user. For example, user bids, user reverse bids own reverse offers and user offers and auction transactions that are listed on this tab. The User Account Overview page also has a tab for the user's wallet 620, including funding information by real or virtual currency. A list of child accounts 622 (discussed below) related to the user provide transaction history and total spent in time and money. Further, a risk profile tab 624 allows the administrator to view the risk class and fraud points assigned to the user. A customer service agent may also use this tab to make adjustments to the user's risk score.

Subscription Management Module

A subscription management module 306 exposes a branded registration and self-service portal within an existing website, allowing the game operator or publisher to present a variety of different offer possibilities, including: free teaser subscription, compound subscriptions, subscription as a pre-requisite for a premium subscription or a premium content offering; a follow-on offer; promotions; email or in-game notifications; multi-lingual offers; and regional pricing and promotions. In a preferred embodiment, the subscription management module is directly integrated with the payment component, allowing for safe and secure recurring payments across the different payment channels 326. Subscriptions are treated the same as specific offers, products and/or promotions. These subscriptions may be have renewals that are automatically or manually processed.

Customer Care and Support Module

A customer care or customer support module 332 provides full insight into all relevant platform activity performed by users. Following strict data protection and privacy guidelines the support agent may have access to browsing behavior and all relevant transaction information. Agents may also modify user data, add personal information only visible to the care organization, or active/reactivate users. Agents with additional permissions can also reverse payment transactions, refund the customer or initiate other "goodwill" actions after closing the case. These "goodwill" actions may be crediting the wallet or pro-longating the renewal cycle of a recurring subscription. A ticket system is provided for tracking.

Payment Gateway Module and Least Cost Router

The payment gateway module 322 manages all interfaces to payment providers, price calculation services and in-application delivery functions. It is used in all three use cases whenever a payment is made. The module is directly connected to the transaction management framework 212 through internal APIs and interfaces, and provides a list of all pay-out transactions. Transactions may be manually approved to be paid out to customers and also may be canceled. Transactions may also be handled automatically when a success response is received from a payment partner. By using account based fraud scoring, a risky transaction may be disabled before the user's transaction is passes on the payment partner.

A preferred embodiment of an in application commerce system and method uses a least cost router 324 that allows the game publisher or administrator to set rules based on business logic and requirements, in order to determine what kind of payment options are available to a particular user and/or for a particular item or offer. The payment option configuration is also tied to the fraud module, which allows a user to set rules on payment options based on various fraud indicators, mitigation schemes and risk/fraud scores. All rules may be configured to be specific per game.

The general payment gateway configuration may be overridden on a per offer basis. In other words, a default "all payment forms" may be supported per offer, but if the administrator would like to overrule the gateway configuration, that may be changed and individual payment forms will be selectable. In this way, the administrator may also restrict payment form characteristics for the offer (e.g. surcharge or discount).

Table 1 lists some of the information may be used to configure the payment forms available for a game.

TABLE 1

Payment Form Attributes

| Functionality | Description |
|---|---|
| Priority | Administrator may assign a priority to the payment form which will define the order in which the payment forms will are listed on the payment selection page. |
| Payment Form | The system name of the payment form. |
| Default Payment Form | Indicates the default payment form for the particular game client. |
| Validity | Allows administrator to enable or disable payment forms for the primary and/or secondary market. Shows whether the payment form is applicable for the market. |
| Country Restrictions | Contains any geographical (country) restrictions on the payment form. Useful for the user experience as well as fraud prevention. |
| Item Class Restriction | Administrator may assign or restrict payment forms to particular item classes. |
| Price Range Restriction | Some payment forms are not proper for low pricing transactions due to high disagio rates (a charge made for exchanging money), the administrator can define the price range for the primary and secondary market on which the payment form should be offered or not. |
| Offer Restriction | Administrator may assign or restrict payment forms to particular offers. |
| Discount | The administrator may define a discount per transaction if the shopper pays with a particular payment form. The discount may be designated by percentage of the gross price, or a flat amount. |
| Surcharge | The administrator may define a surcharge per transaction if the shopper pays with a particular payment form. The surcharge may be designated by percentage of the gross price, or a flat amount. |
| Action | Allows administrator to edit prioritization, validity, defaults and restrictions. |

Having configured the payment gateway for a particular game, any transaction requested by the game player will offer only those payment options that meet the payment, offer and fraud configuration selected by the user.

The least cost router may also be configured to determine a preferred payment provider. Based on factors such as currency, payment method, amount, country, exchange rates and others, the least cost router can locate the most cost effective payment provider for any transaction and direct the payment transaction to that provider through the global payment framework.

Global Payment Framework

A global payment framework 220 manages all outgoing interfaces (see Table 19, below) to payment providers (including clearing, refunding, charge-backing, settlement and invoicing 222), currency calculation services and in-game delivery functions. It is directly connected to the transaction management framework through internal APIs and interfaces to the reporting database 226.

The payment module 326 manages all outgoing interfaces to payment providers and currency calculation services to handle payments, recurring payments and refunds. It is directly connected to the transaction management framework through internal APIs and interfaces to all relevant back office and reporting tools.

All real-money-relevant payments are handled through the platform. Depending on the type of transaction only a selected choice of payment options is offered to the end-user. The payment module 326 receives the final price from the offer management tool and handles the actual payment process by interacting with external payment systems.

An in-application commerce payment module is extremely flexible in design and can integrate with a large number of different payment providers in parallel 326. A configurable set of rules determines automatically the right provider that should be used for completing the actual transaction. Attributes determining the use of the right payment provider include the transaction value, the region, the risk profile for the particular transaction and customer preferences and can be easily extended if required. An example would be to exclude credit card payments for low transactions values due to the high fee structure or to only allow prepaid payment options if the customer behavior shows a high risk rating.

A payment module 326 also exposes interfaces to reporting 328 and customer care 334 applications in order to give insight into the status of the transaction and allow the triggering of refunds and reverse the purchase if necessary. The payment gateway is highly flexible, capable of supporting many payment methods all over the world, including credit cards, payment enablers (e.g. PayPal, moneybookers, etc.), prepaid cards and mobile payment channels.

Transaction Module

The transaction module 322 calculates secondary market revenue shares and triggers correct payout procedures. Receiving dynamic input data from the auctioning module, the tax database and a currency calculation service, the settlement process is executed at predefined times and calculates revenue shares according to pre-defined rules. The rules are defined through a restricted configuration tool that provides the functionality for defining revenue share ratios, price-ranges, minimum prices, payment terms, and settlement periods, etc. as rule-sets for calculating the shares.

Fraud Management, Detection and Control

Fraud management, detection and control are critical components of any online commerce system. A fraud management, detection and control module 336 (aka fraud defender module) includes internal and external fraud controls that ensure that each transaction is properly authorized by role/risk-class and evaluated against fraud checks to prevent chargebacks and protect customers. It allows the customer to detect and manage fraud across channels and accounts, and to define fraud detection, scoring and controls to suit any kind of rule desired. The customer may configure the system in a way that allows the fraud defender module to control various aspects of the user's commerce experience, including the offers, payment methods and reverse wallet thresholds that are presented to the user.

As will be recognized by one of ordinary skill in the art, the parameters for a fraud detection and management system and method are configurable within the general framework of the fraud defender module. In general, a preferred embodiment of a fraud defender module allows configuration of rules for setting, incrementing and decrementing fraud scores (also referred to as risk score or risk scoring); for tracking user events; for setting and adjusting risk classifications; and for configuring rules and consequences for the results of fraud score/classification evaluation. It will be appreciated by those skilled in the art that incrementing and decrementing of fraud scores can be accomplished by assigning positive and negative fraud points to user accounts based on fraud controls and then summing those fraud points together to arrive at a total fraud score.

A fraud rating, or points, can be attached to virtually any kind of event (e.g. behavior, function or action) that the user is capable of performing internal or external to the platform. As will be described in more detail below, fraud ratings may be configured for commerce platform-related events, game play events, or $3^{rd}$ party events.

The user (account holder) is typically assigned a risk class and a customer is able to modify the assigned risk class for every account. Manual assignment may override automatic assignments until the manual assignment is lifted. As the user moves through the application the user's risk score is updated frequently, incremented and decremented as the user is involved in any of the configured events, which may or may not adjust the originally assigned risk class. Fraud controls are applied based on the risk classification identified by the user's fraud score in the user account. Fraud results and case management may be fed back into the legacy systems from which the fraud originated. This allows the customer to further refine fraud detection on its site.

The fraud defender module tracks user events and assigns and updates the fraud score per user with any kind of activity or event the user is performing in the application or game, on the commerce platform, or external to both (such as a payment provider detecting fraud on the user's credit card). Examples for increasing a user's fraud score include increases based on information gathered during the credit card registration process, fraud information from a payment partner, chargeback ratios and transaction disputes (discussed further in the paragraphs below and Table 4). Examples of events that may decrement the fraud score making the user less of a risk include game events such as adding new friends, or commerce events such as successful transactions, closing of dispute tickets, wallet turnover, and/or other trust increasing events coming from the application/game itself.

Rules may be configured as a direct consequence to certain events or as the result of the risk classification into which the user's fraud score falls. For direct consequences, purchase transactions may be denied. For example, anyone who is banned or suspended from game play may have purchase transactions denied. Similarly, anyone who in the past was banned or suspended from game play may be assigned fraud points which would result in a higher fraud score after the user account has been reactivated after the ban or suspension has been lifted. Users connecting from a country that is blacklisted or identified as risky, based on the knowledge that fraud is prevalent in transactions from those countries, may be denied purchase transactions. In addition, the system may perform a velocity check, tracking the number of transactions per time frame (i.e. tracking "transaction throttling") and the amount per transaction and provide an error to the transaction server if certain rules are violated. The rules and results are configurable. Other results may include blocking the account for a particular period of time with an increase in the user's fraud score, denying transactions for blacklisted payment forms, or classifying as a blacklisted error type and increasing the fraud score if payment partners respond with an error on a user's transaction.

Fraud/risk classifications are also configurable. The default risk classes in the system are: no risk, small abnormality, abnormality, risky, fraud most likely. The customer may set the risk classifications as ranges of fraud points and then attach results to them, such as payment forms and user roles. This may be accomplished in the fraud module using fraud management GUIs and APIs (fraud module), or other modules with specific fraud-related rules, such as the Offer and Store Management 308 and Least Cost Router 324 modules.

In a preferred embodiment, the fraud defender module receives event messages from the application, commerce system and $3^{rd}$ party platforms (such as payment providers) and feeds them into a messaging middleware 318, such as RabbitMQ. Using a messaging middleware allows events to be processed asynchronously at frequent intervals. Users' fraud scores are updated as the messages are processed.

As mentioned above, fraud controls are applied based on the user's fraud score and risk classification level. For example, a user entering the game for the first time may have no history and so begins with a relatively high fraud score and risk classification and is therefore only offered payment methods with the lowest risk (e.g. prepaid debit cards). The user then spends 11 hours in game play, during which time his behavior is tracked as he accumulates tracked play actions over time in the game, adds friends, successfully completes purchase transactions, and/or performs other types of customer-identified and configured events that indicate his propensity for fraud. The tracked events are then used and compared to fraud control rules to update (increment or decrement) the user's fraud score. If his behaviors have lowered his fraud score (i.e., the fraud control rules have decremented fraud points from the user's fraud score), he may be offered additional payment methods and access to additional content areas that are available at the lower risk classification level.

The fraud defender module may work with a least-cost/risk router 324 module that allows the customer to set rules that determine payment types, offers or content to be presented to the user based on various criteria, such as risk class. User behavior may be tracked by the in-application commerce system or by the game application itself, and imported into the in-application commerce system through event messages that are in turn used to further update a fraud score based on fraud controls. Payment methods and transaction limits offered to a user or access to content areas may change as a result of the user's fraud or risk score.

Figure 7:
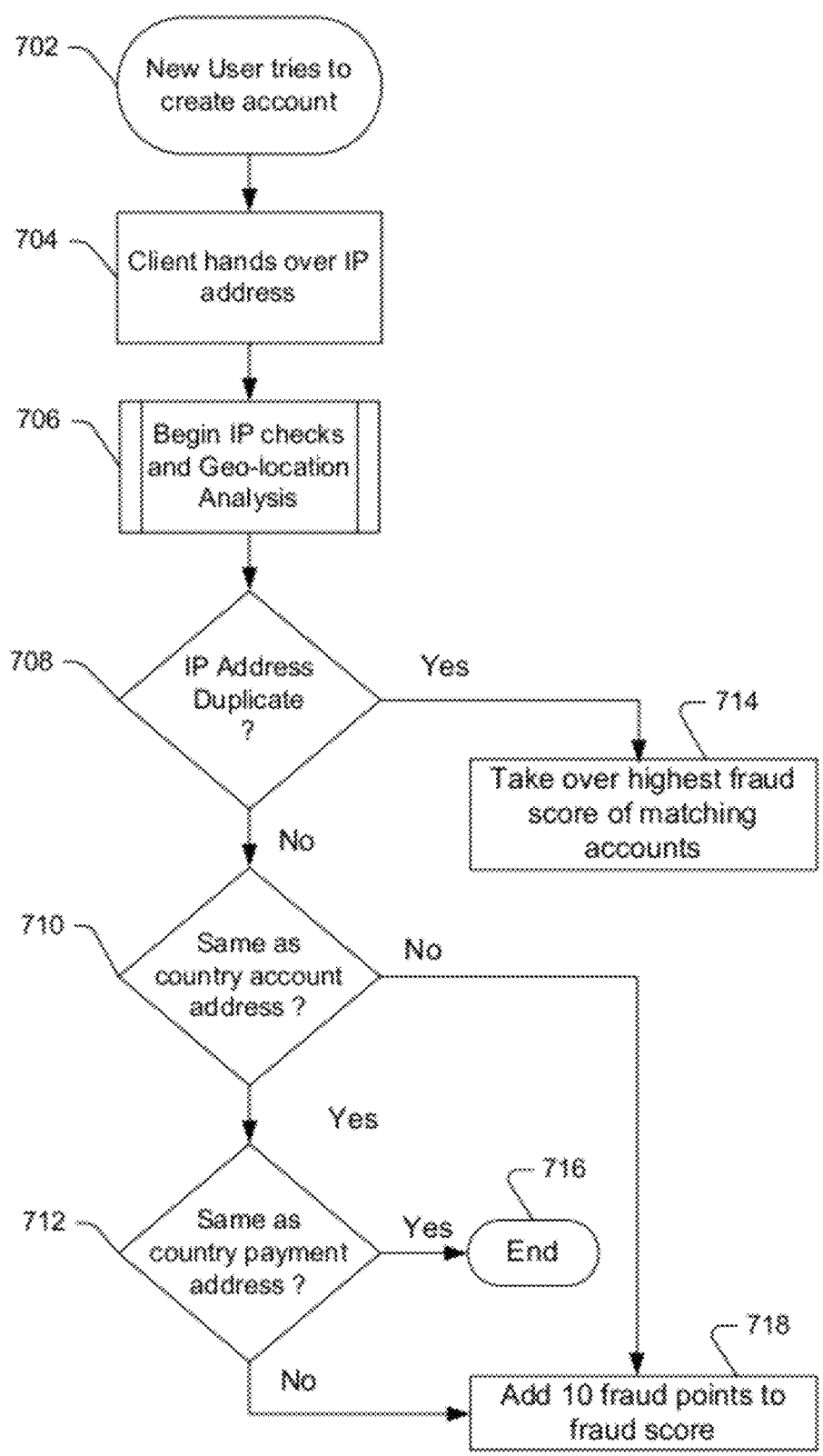
FIG. 7 is a screen shot of a subscription management page which allows a content manager to create a subscription.
Figure 8:
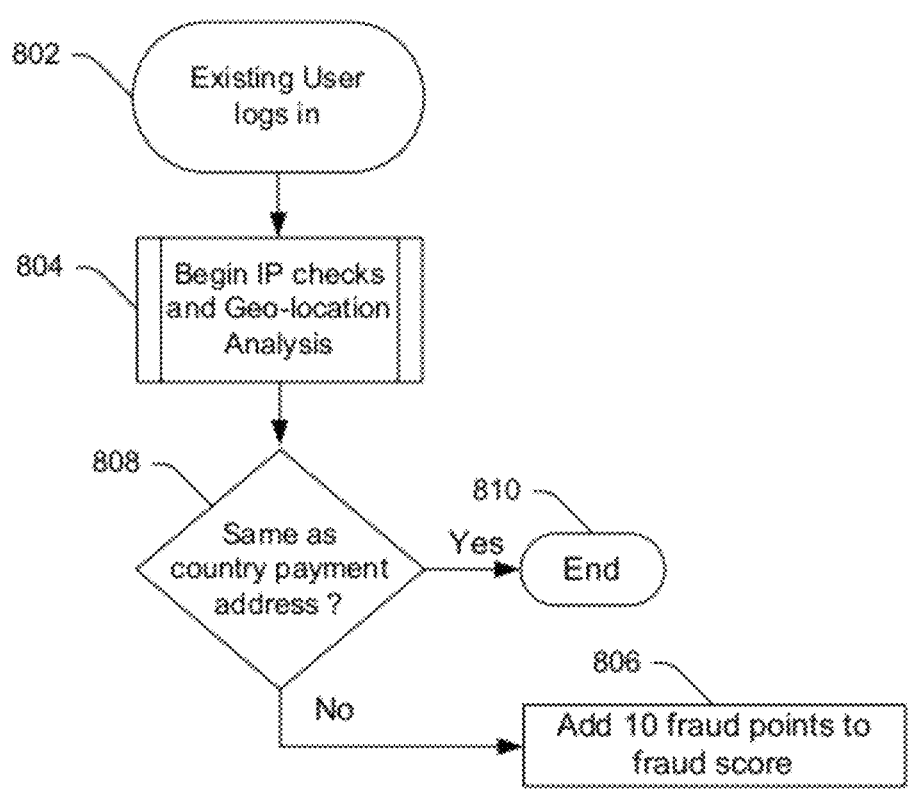
FIG. 8 is a screen shot of the portion of a Create a Subscription page allowing the content manager to add a portfolio image to the file.

A number of fraud controls may be applied to each transaction, including, for example, usage pattern detection, customer risk classification and payment method restriction by risk class. Each user account is classified by risk class based on automated tests of user specific data as well as through user behavior. For example, during the account registration process 702, as shown in FIG. 7, the platform checks the user's Internet Protocol (IP) address 704, and uses it to perform several checks 706. The first process checks to see if there are other accounts already available within the system using the same credit card 708. If multiple users are using the same credit card, those users will be set to have the same fraud class (all using the highest fraud class of the impacted user accounts 714). Second, it is used for matching of geo-location to account address 710 and payment method address country 712 information. In this exemplary scheme, ten fraud points are added 718 to those accounts where the IP address does not match the country on the account or payment method, while matches result in no additional fraud points 716. Additionally, as illustrated in FIG. 8, for each login 802 via SOAP the IP address is retrieved 804 and is compared to the billing/payment address (if available). The correspondence is on a per-country basis between the declared address and the reported IP address. Values may be checked per login. If a person with a Canadian billing address logs in 5 times from an IP address in Canada and 15 times from the United States of America it would be a 75% ratio. Fraud points 806 are added to the profile when login events occur where the country settings 808 on the user account address do not match the country identified by the IP address identification. No additional fraud points are added if a match 810 occurs. Additionally, the IP address may be used for $3^{rd}$ party event sourcing. The fraud system is capable of supporting externally triggered fraud events like error messages from payment partners or client related events or fraud/risk scores.

Figure 9:
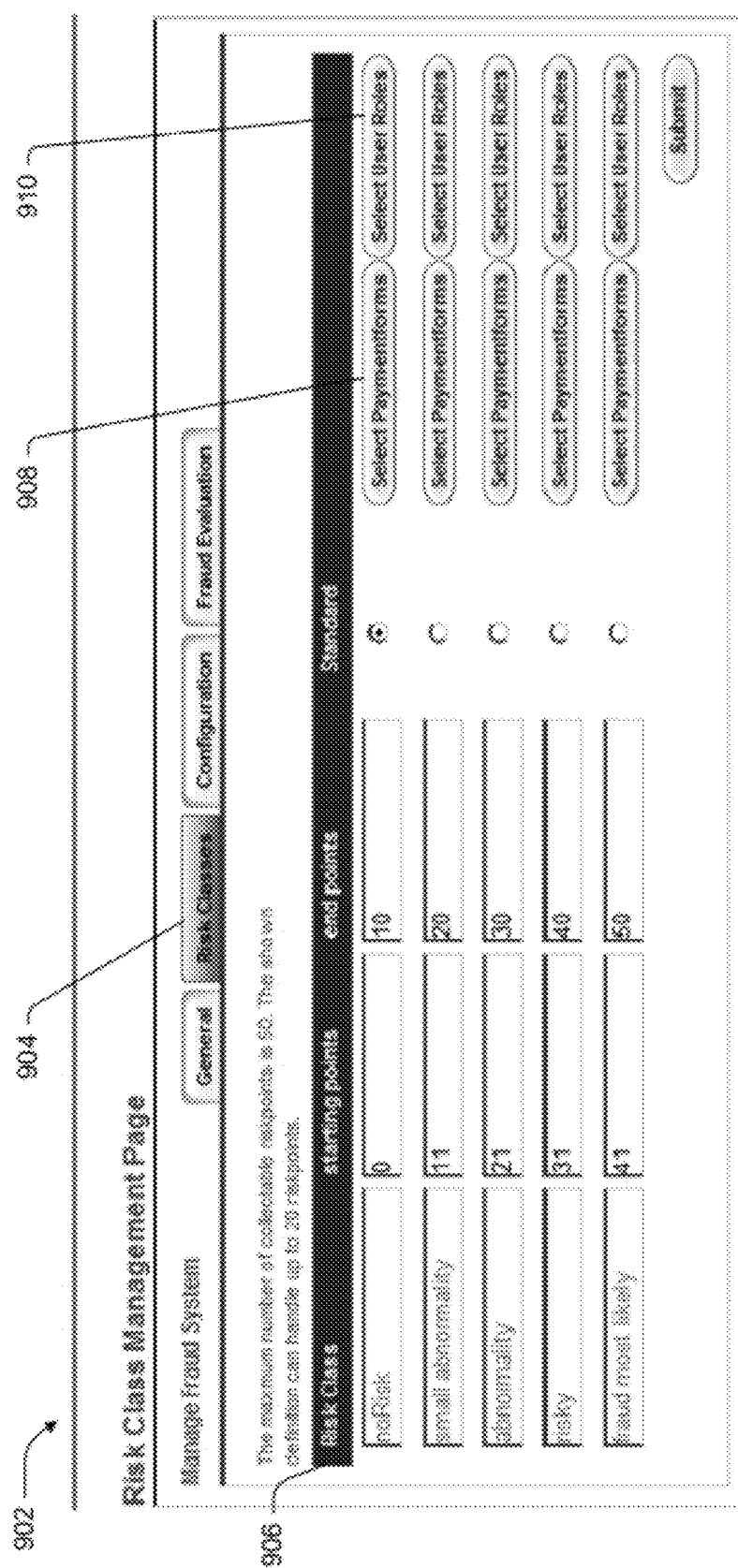
FIG. 9 is a screen shot of the portion of a Create a Subscription page allowing the content manager to define the purchase procedure for a subscription.
Figure 10:
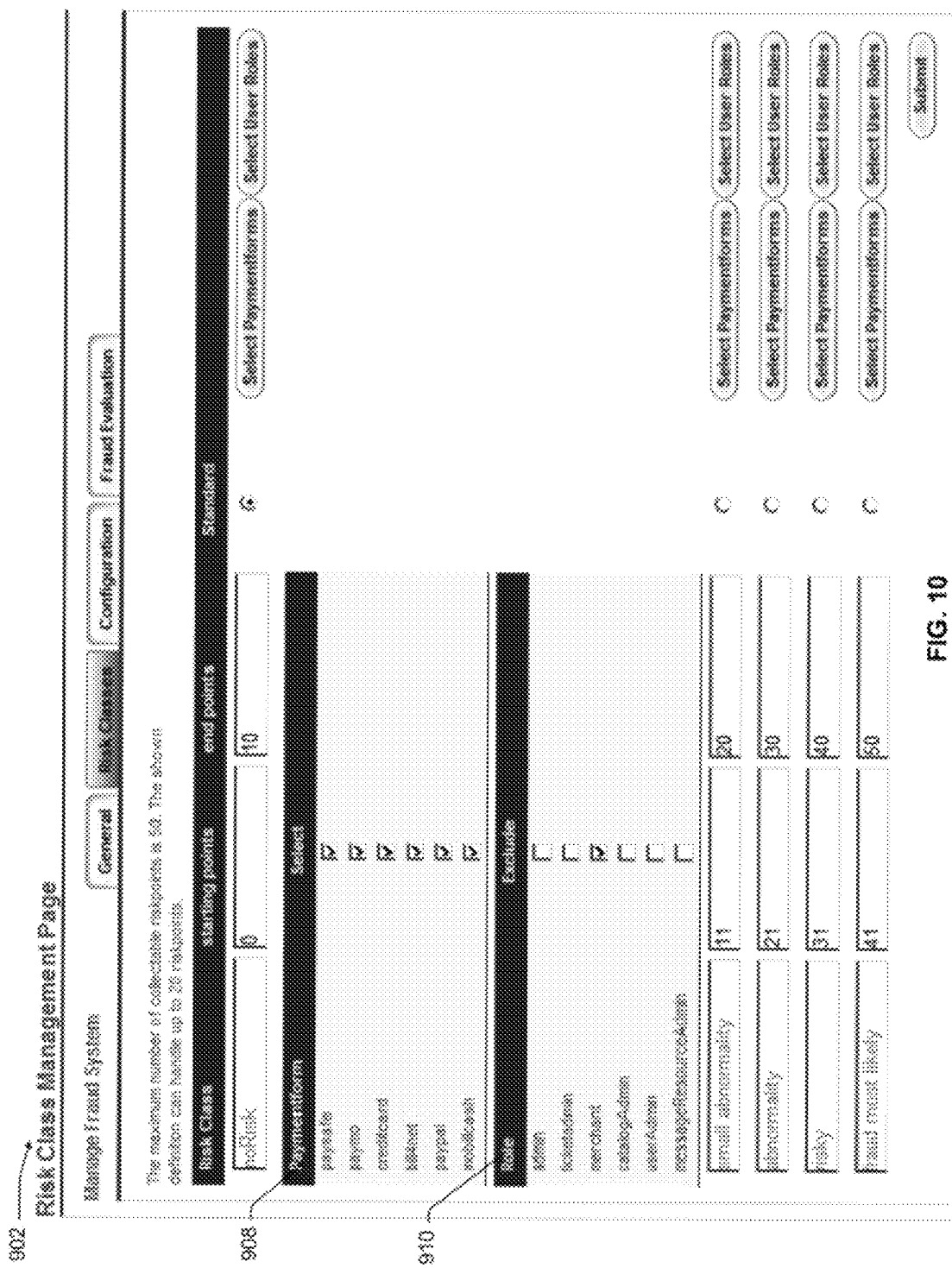
FIG. 10 is a flow chart illustrating the process of determining a risk score contribution based on IP address and credit card information.

In a preferred embodiment, default risk classes may be set up. In a five level schema those default classes may be: no risk, small abnormality, abnormality, risky, fraud most likely. On the Risk Classes tab of the Risk Class Management Page 902 shown in FIG. 9, risk classes 904 are defined according to application needs by setting ranges of risk points 906 for each of the default risk classes. Alternatively, the administrator may set risk classes according to game requirements. For each risk class, the administrator may associate selected payment forms 908 and user roles 910, as shown in FIG. 10 as well as the additional user-specific classification conditions, which are offered by way of example and not limitation, described in Table 3.

The administrator is able to modify the assigned risk class for every user account. Manual assignment may override automatic assignments until the assignment is lifted. Offered by way of example and not limitation, the following conditions may be affected by user specific fraud classification:

TABLE 3

Exemplary User-Specific Fraud Control Condition

| Fraud Condition | Definition |
|---|---|
| Role assignment | For secondary markets. Can define if a certain risk score is a precondition to become a merchant and to disable automatically the merchant status if a user gets a higher risk class assigned |
| Item offering | The risk score can limit the portfolio of the purchasable articles to avoid any fraud risks losing high value items |
| Payment forms | Based on the risk class a different set of supported payment forms are offered to the buyer. In terms of a high risk score the buyer gets only prepaid payment forms offered or he even is not allowed to purchase a dedicated item |
| Limit amount of transactions per day | Define per risk score the exact amount of transactions a shopper is allowed to perform per day |
| Limit maximum amount per transaction | Define per risk score the maximum amount per transactions a shopper is allowed to purchase |

Figure 11:
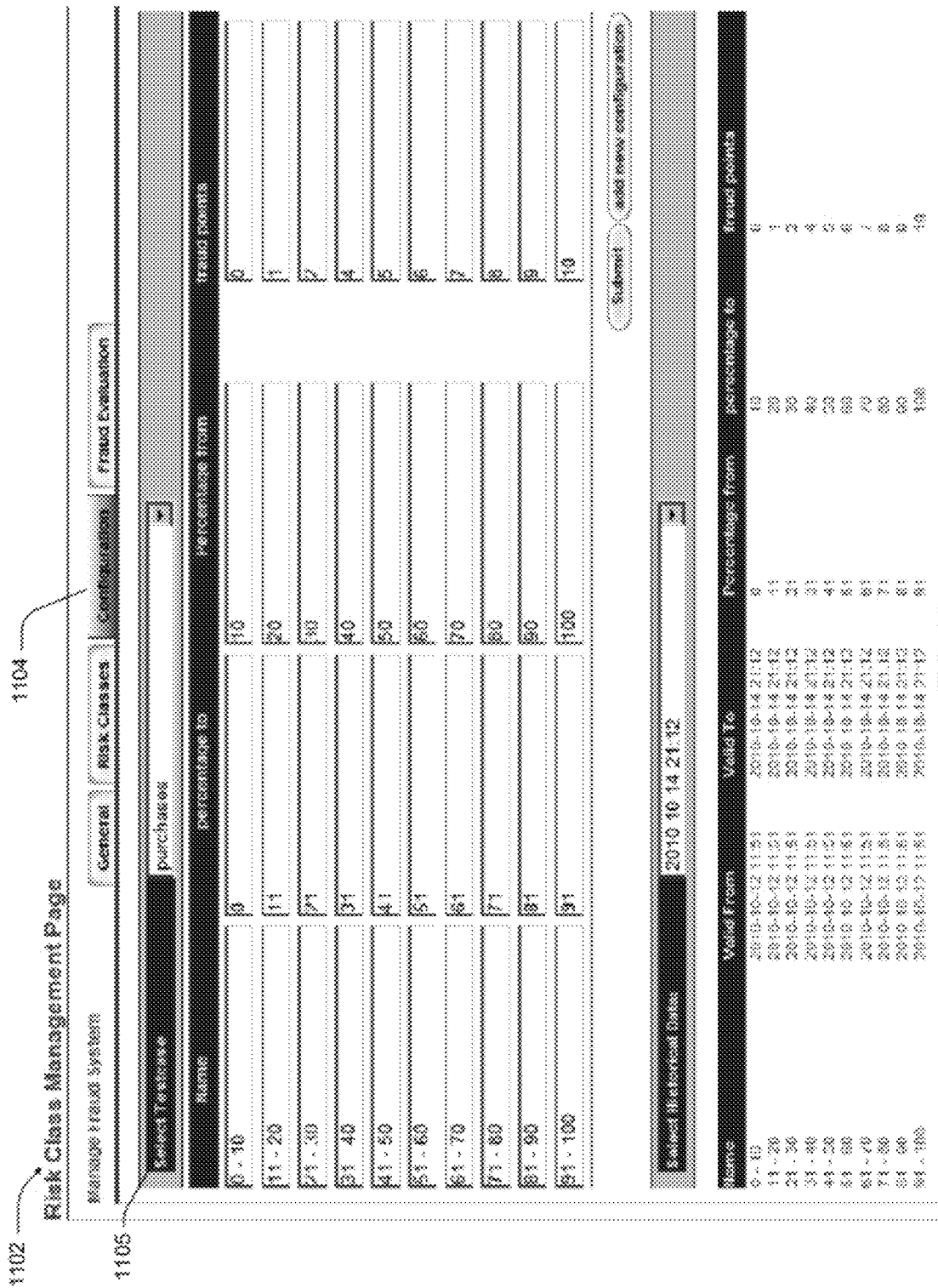
FIG. 11 is a flow chart illustrating the process of determining a risk score contribution based on IP address on login and the country settings on a user account.

FIG. 11 is a screen shot of the Configuration Tab 1104 on a Risk Class Management Page 1102. Administrators may create a test case for determining risk, such as the "purchases" test case 1105 displayed. This process is further illustrated in FIG. 12 and described below.

Figure 12:
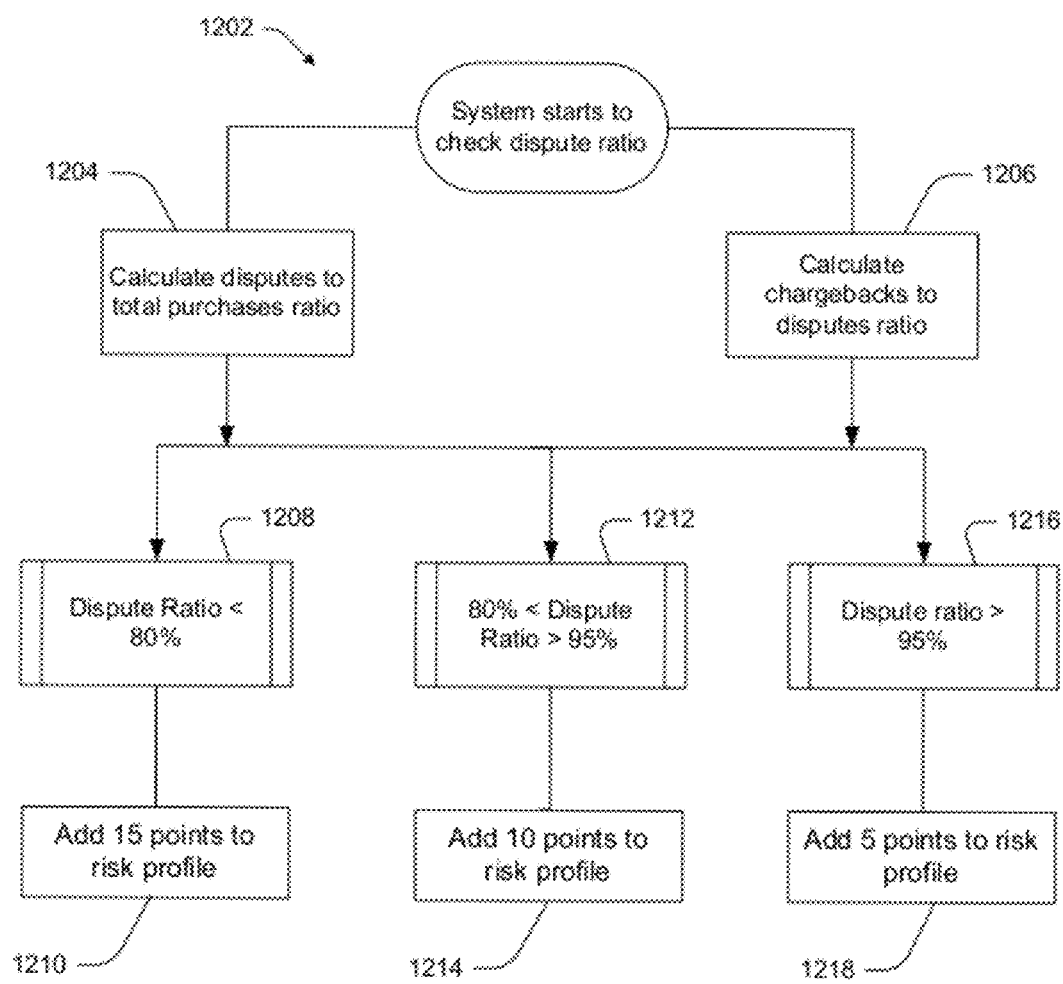
FIG. 12 is a flow chart illustrating the process of determining a risk score contribution based on customer dispute behavior.

Exemplary variables for calculating user activity-driven fraud classification are provided in Table 4, below. The process illustrated in FIG. 12 1202 provides a risk score based on the ratio between chargebacks, refunds and total disputes. The dispute ratio refers to the total number of disputes opened by the user compared to the total number of items purchased. If a user purchases 10 items and opens 3 disputes it gives a dispute ratio of 30%. A disputes/total purchases ratio test compares the number of open disputes to the total purchases 1204 and assigns a risk score. A chargeback/disputes ratio compares the number of open disputes to the total number of disputes 1206. Fraud risk points 1210 may then be added to the user's risk profile or overall fraud score according to the application's preferred business logic 1208. For example, when either disputes ratio 1204, 1206 is less than 80% then the business logic 1208 adds 15 points 1210 to the user's fraud score. Similarly, a disputes ratio between 80% and 95% the business logic 1212 adds 10 points 1214, and with a dispute ratio greater than 95% the business logic 1216 adds 5 points 1218.

TABLE 4

Exemplary User Activity-Driven Fraud Classification

| Classification Factor | Definition |
|---|---|
| Chargebacks/ disputes ratio | The ratio between open disputes and total disputes - the dispute ratio refers to the total number of disputes opened by the user compared to the total number of items purchased. If a user purchases 10 items and opens 3 disputes, it gives a dispute ratio of 30%. |
| Disputes/Total Purchases Ratio | The system checks total number of disputes/chargebacks relative to the total number of purchases and assigns a risk score. Compares the number of open (non-resolved) disputes to the total number of purchases. |
| Payment frequency check | The system looks at the frequency of user transactions |
| User role - Buyer = seller | The system looks at whether the buyer also a seller (merchant). For secondary markets only |

The system further provides a near real time fraud check and batch 208 processing of events. A dedicated fraud batch 208 job analyzes credit card registration and payment events, runs the automated tests for the users who have triggered an event and updates the risk score and risk class of the user accordingly. The batch 208 job may be run at any frequency; typically one minute to keep the user risk scores as current as possible.

As discussed above, fraud scores allow the game publisher to limit the payment methods, transaction limits, offers and content available to a customer. These restrictions involve comparing the risk score of the shopper (user) with an acceptable value. The point of comparison and acceptable risk scores or ranges may be configured by an application administrator. When the shopper begins to purchase an item, the transaction server receives the shopper's risk score and an available list of payment forms. The system may use a least cost router, which determines the optimized payment form due to price point and country. In this case, only those optimized payment forms available to the shopper's risk score are presented to the user.

Transaction limits are also imposed by the shopper's fraud or risk score. Fraud defender tracks the amount per transaction and provides an error to the transaction server if certain rules are violated. Fraud defender returns only time value for how long the account is blocked for further purchases. As a precondition, velocity rules may be defined on limiting the maximum amount per transaction. When the shopper begins the purchase process, the transaction server hands over the details (e.g. price, type, etc.) and the shopper information to the fraud defender message queue. The transaction server checks the fraud score and continues with the checkout if the score is below (or exceeds) a threshold level. If not, the transaction server prompts an error notification and updates transaction history.

Similarly, based on the fraud score, the transaction server will disable certain products, bundles and/or subscription plans. This requires that the effective offers have risk scores or ranges attached that define allowance for purchase. When the shopper (user) performs the purchase process, the transaction server receives the risk score for the shopper and compares it to the allowed risk score for the offer s/he is attempting to purchase. If the shopper's risk score is in the "allowed" range, the transaction server continues to checkout. The point of comparison is configurable. If the shopper's risk score is outside of the "allowed" range, the transaction server prompts an error message, the purchase transaction is aborted and transaction history is updated.

Figure 13:
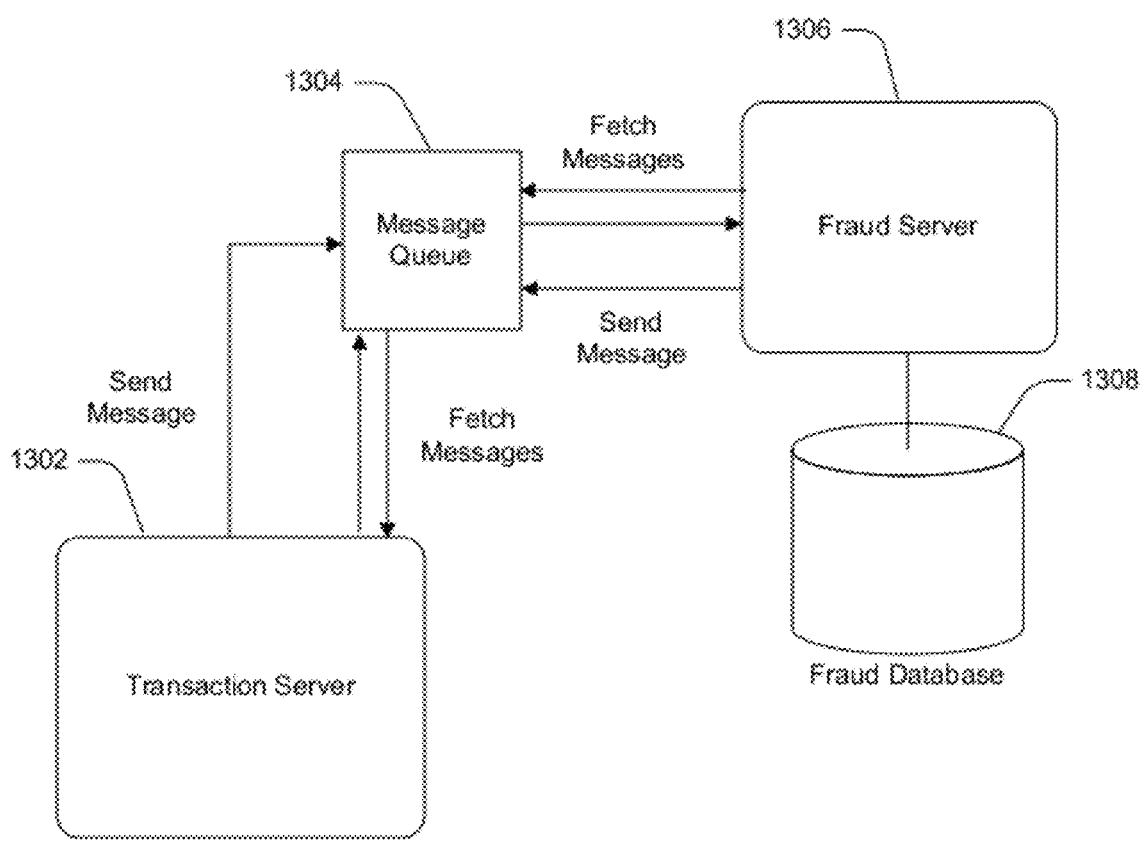
FIG. 13 illustrates the fraud defender module and message feed system.

FIG. 13 illustrates an exemplary fraud defender module and messaging system setup. The transaction server 1302 handles all transactions for game purchasing. Event messages are sent to a message queue 1304, where they are retrieved by the fraud server 1306. The fraud defender server includes a fraud database 1308. The fraud defender server is service oriented with interface definitions, with CRUD (Create, Read, Update and Delete) operations for each service. Table provides some exemplary web service calls for a fraud detector module. The events that are sent back to the transaction server from the fraud module may include the fraud score (for example, the account id, the fraud score and the date); the transaction limit (e.g. the account id and the time the transaction was denied); and the purchase limit (e.g. account id, max price for the transaction and the time the purchase was limited). Those skilled in the art will recognize that there are many events that could be defined based on the fraud defender so far described, and would include others without departing from the scope and spirit of the described system.

Reporting and Analytics Module

A reporting and analytics module may be designed for a game publisher depending on its requirements. Data is duplicated from the master database to the slave database to avoid any performance loss through report queries. Both standard and ad hoc reporting is available. It will be appreciated by those skilled in the art that reporting may also be accomplished with a set of predefined reports. As an admin, a user, is allowed to define any type for the existing reports (data aggregation, frequency, etc.) The lowest increment in a report ideally is 1 hour. As such this reporting process may be performed asynchronously and may run on the same database as the application with minimal potential performance impact. Messaging is provided for notification and communication. A tax engine is also provided to accommodate all tax requirements.

Store and Primary Market Components

Store and primary market modules include offer and store management 308, inventory/item management 312, economy management 422, discovery & presentation 424.

Offer and Store Management

An offer and store management module 308 provides the end-user presentation functionality and handles everything concerning the management and presentation of the store elements and inventory. All management and UI functions may be available via APIs and via a web-based presentation layer. From a functional perspective, all features described can be presented across different browsers, presentation layers or as content-feed for in-application discovery clients.

A preferred embodiment of an offer and store management module allows client (such as a game publisher) developers and even players (for the player-to-player use case) to set up their own stores to present and merchandise the articles they want to sell.

Using the web-client, users can customize their stores with a title, an intro-text, activate certain community features or modify the store's look and feel using a WYSIWYG (what-you-see-is-what-you-get) editor. This allows real-time editing of the shop-window and gives users a great set of tools to manage and merchandise their products. Depending on the product category and the application configuration, the system can dynamically present the right attribute fields to be completed by the content manager.

Alternatively, or in addition to the web-client, a content catalogue API may be used to manage the inventory and all of its attributes remotely. Example attributes are: article title, article category (item/service/currency, etc), article description, game server, tags and keywords, reselling options. Independent of the article, the content manager can also define pricing and auctioning models or combination and the delivery options, such as: auctioning model (auction/buy now/reverse auction), number of articles, auctioning period, delivery period, accepted payment methods (relevant for real money trading). This is established through the definition of event identifiers or "event IDs". Event IDs are pre-defined sets of offer attributes that can be assigned to a specific product or a set of products. They allow efficient management of many different products and offers simultaneously. More about event IDs is provided in reference to economy management, below.

Economy Management

A key function of a content manager may be to oversee the control of the in-application economy 422. Leveraging the reporting and analytics tools 328, the content manager can identify potentially problematic economic behavior problems. Typical economic problems associated with an in-application economy are inflation, artificial scarcity and speculation. Preventing and controlling inflation are crucial when dealing with virtual currencies. Inflation is caused by a fast-growing supply of the available currency, therefore, it is important to watch and control the total amount of virtual currency available to users. Artificial scarcity occurs once the secondary marketplace reaches a critical mass and some people attempt to exploit the economy by artificially shorting the supply of certain scarce goods to maximize their personal revenue. Scarcity may be controlled by controlling the amount of available articles of a particular kind, controlling re-selling capabilities, the lifetime of items and by tracking user patterns and purchase behavior. Speculation is not necessarily a bad thing, but if it gets out of hand, the practice may be stemmed by binding certain items to a particular user, either permanently or for a specific period.

To control undesirable economic events, economy-related information and parameters are separated into a set of attributes called an event. An event may be assigned to every product item template and defines how the item will be handled in the primary and secondary market with regard to scarcity, pre-conditions, cool down periods, and other economic events. In this way, the economy is controlled by defining the availability of items within the markets and whether the items are allowed to be resold, etc. The behavior of a huge number of items may be changed simply by changing the set of attributes (events).

Figure 14:
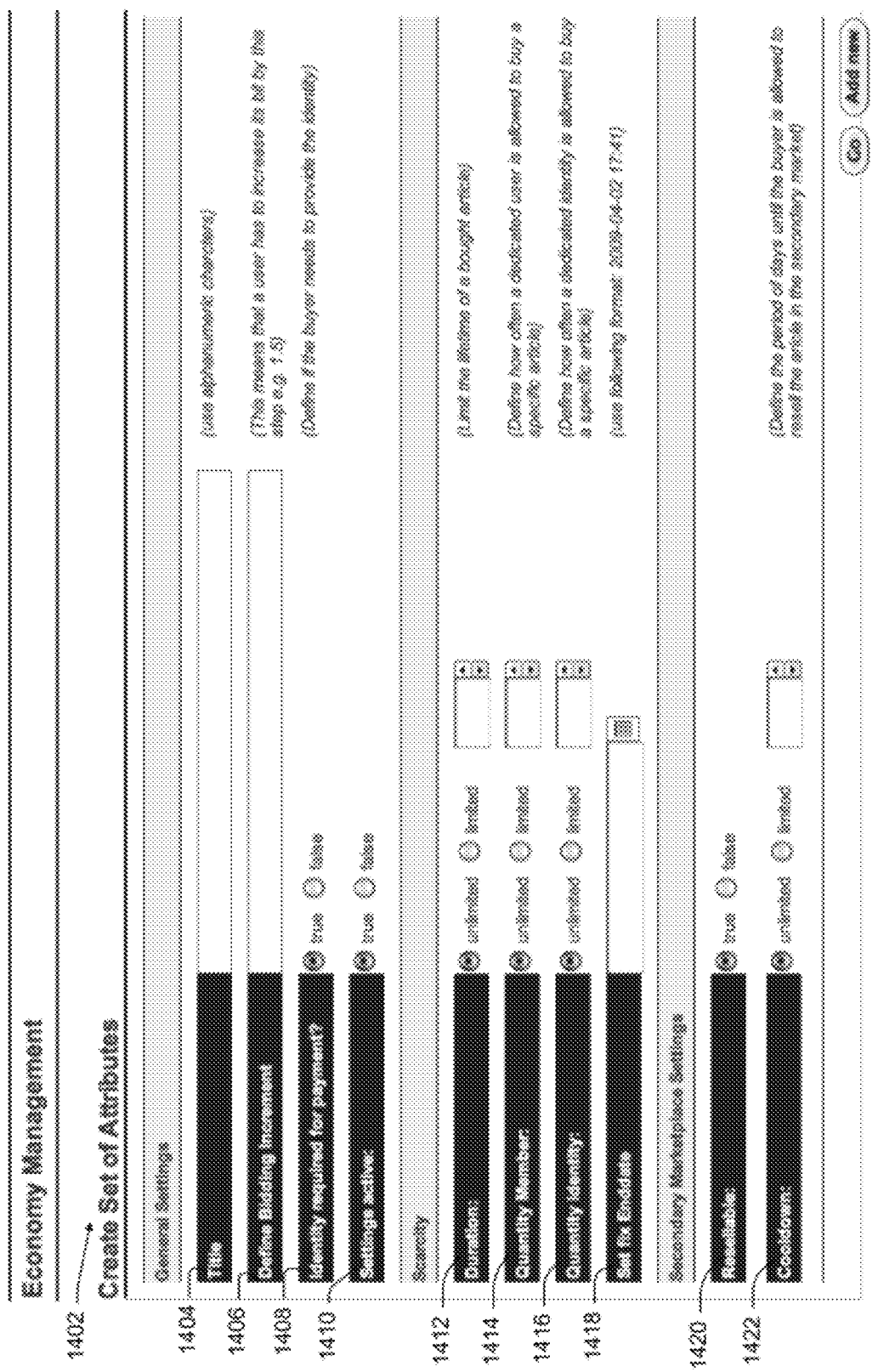
FIG. 14 is a screen shot of the Risk Class Management page allowing a content manager to set ranges for risk classes.

Events may be created using a user interface 1402 provided in the economy management module, through a set of APIs, or by bulk upload. As illustrated in FIG. 14, the fields described in Table 5 define an event.

TABLE 5

Create Attribute Set Settings

| Field | Definition |
| --- | --- |
| Title (1404) | The name of the set. Displayed when a template has been created |
| Define bidding increment (1406) | Fill in bidding increments for auctions. If the bidding increment is 1, the offer bidding is $1 so the next bidder has to bid a minimum of $2. |
| Identity required for payment? (1408) | Indicates whether an identity is required for payment; a user can have 1-n identities. They can be mapped to in-game roles. |
| Settings active (1410) | Make the settings for the attribute set active. |
| Duration (1412) | If duration is desired, check "true" and fill in the number of days. Setting this field will make a primary market subscription of this event. |
| Quantity Member (1414) | Quantity of an item a user can buy. Blank for unlimited. |
| Quantity Identity (1416) | Quantity of an item an identity can buy. Blank for unlimited. |
| Set fixed end date (1418) | Fill in a fixed end date for this attribute set |
| Re-sellable (1420) | Set "true" if the item is re-sellable, "false" if it can be sold only once. |
| Cool down (1422) | The cool down period defines how many days this item has to be held by the user until he can resell it |

Ancillary modules and administrative tools are provided in a preferred embodiment of a modularized in-application commerce system and method. These tools allow the game publisher to optimize the user experience and include, by way of example and not limitation, dispute management 330, and customer relationship management 332.

Player-to-Player Trading Components (Secondary Market)

Figure 4C:
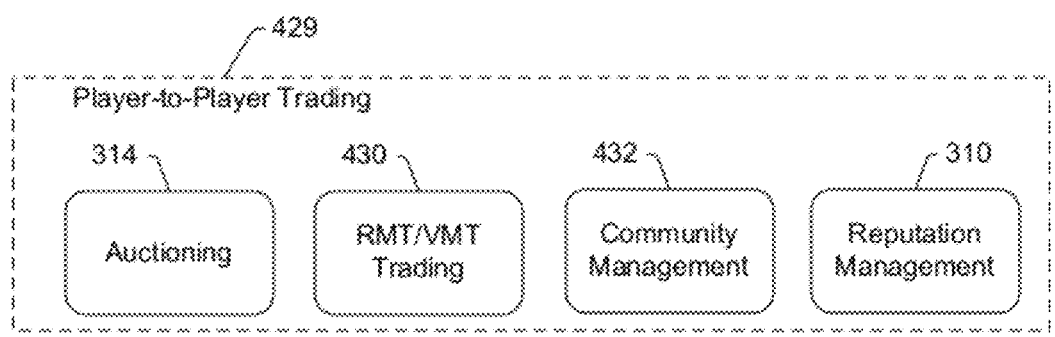
Figure 4D:
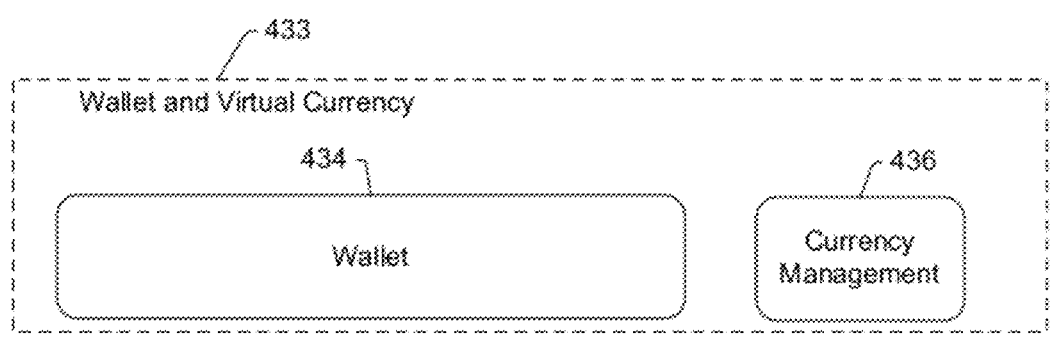

A player-to-player trading use case allows application participants to set themselves up as merchants, create a store and offers, and buy and sell items in a secondary marketplace. Components of a secondary market use case are illustrated in FIG. 4c. Exemplary modules for this use case include an auction module 314, real money trading/virtual money trading module 430, community management module 432 and reputation management module 310. In addition, the secondary marketplace leverages various other components of the overall system, including account/user management modules 402; inventory modules 312, offer and store management modules 308; economy management modules 422, and others.

Auction and Transaction Management

Auctioning and transaction management 314 are backend component modules with standardized interfaces to the presentation layer and to a number of internal and external remote systems, including data warehouse systems and payment gateway. The platform supports all auction mechanisms and is optimized to support the specific requirements of dealing with intangible goods and virtual services. Table 6 describes the different types of auctioning models.

TABLE 6

Auction Models

| Model | Description |
| --- | --- |
| Standard auctioning | Represents the most common use-case for a secondary marketplace. The seller can define a minimum price, a bidding start date, end date and the highest bidder at the expiration time of the auction buys the article |
| Fixed price purchase/ Instant buy | Seller fixes a price for his virtual item or service. Fixed price articles can be either offered as standing offer or only for a limited time, similar to a standard auction |
| Dutch auction | Dutch auctioning is a sophisticated but proper way of handling auction if more than one product of the same kind is up for sale |
| Reverse auction | A buyer's market model. Allows the buyer to submit product or service delivery requests in the form of an auction. The buyer can define the type of product or service he is interested in purchasing, an auction end date and the maximum amount he is willing to spend. After the auction has expired the buyer can choose the merchant who subjectively offers the best value for the offered price. This is specifically relevant when searching for the provision of in-game services. |

Community Management and Reputation Management

The community management 432 and reputation management 310 modules support an efficient marketplace by allowing participants to rate other participants in their role as either a buyer or seller, depending on the user's role in the transaction. The ratings system is specifically tailored to correspond with the needs and requirements of dealing with intangible goods and services. Users wishing to rate another user's role in a transaction may rate it on several levels, according to game requirements. For example, a seller rating may include the following rating levels: 'Met expectations,' 'on time delivery,' 'price/quality ratio' and 'shop here again.' Information about the transaction may be provided in a list and comments section. Generally, users are rated under their game or application identity. In order to sharpen the actual message expressed through the rating, every user is assigned an overall rating value, endorsements by users as well as a more granular rating scale. In addition, the platform adds automatic ratings in case dispute cases are opened or any other type of repeated misuse is being recorded.

Additional community management 432 features include profile pages, where users can present themselves, their preferences, characters and interests; messaging and instant messaging (IM), for communication between players (supported by external email notifications) or through instant messaging services (e.g. Skype, Yahoo, MSN, etc) that are integrated into the platform; a blogging system so users can launch their own blogs; and a calendar that acts as a filter instrument to display ending auctions and community elements where merchants can mark the dates for events.

Transaction management and processing 212 is an underlying framework interfacing with a significant number of components and systems, including the auction module, the rating logic, the payment and the fulfillment components. It logs every step as a basis for reporting and customer care purposes.

Payment 326, settlement and fulfillment manage outgoing interfaces to payment providers, currency calculation services and in-application delivery functions. It is directly connected to the transaction management framework through internal APIs and interfaces to all relevant back-end and reporting tools. These APIs are described in Table 25, below.

The secondary market modules also interact directly with the clearing and settlement module 322 to calculate revenue shares and trigger correct payout procedures. Receiving dynamic input data from the auctioning component, the tax database 416 and a currency calculation service, the settlement process is run at predefined times and calculates revenue shares according to pre-defined rules. The rules are defined using a restricted configuration tool, allowing defining revenue share ratios, price ranges, payment terms, and settlement periods, etc, as a rule-set for calculating shares.

After successful calculation of the revenue shares the payout can either be verified and approved by authorized personnel or directly transmitted to the parties eligible to receive the funds. The process is completed by updating the status of the process in the transaction history and by automatically and dynamically generating a proper invoice 324 in pdf form.

Secondary markets are enabled for trading in virtual currency as well as real money 430. Trading with both real and virtual currency through the wallet is described below. The wallet is the safest payment option, as the wallet has already been funded when the purchase is made. When trading with real money, buyers may choose from among the payment providers subscribed to by the platform's payment gateway, or a third party gateway with which the platform is integrated. There are some disadvantages to trading with real money. The fraud risks are higher compared to wallet transactions where the real money purchase has already been fulfilled. The purchase flow is asymmetric and may take longer or the buyer may not complete the purchase flow. In addition, there is a risk of money laundering if a cash-out option is offered.

Figure 15:
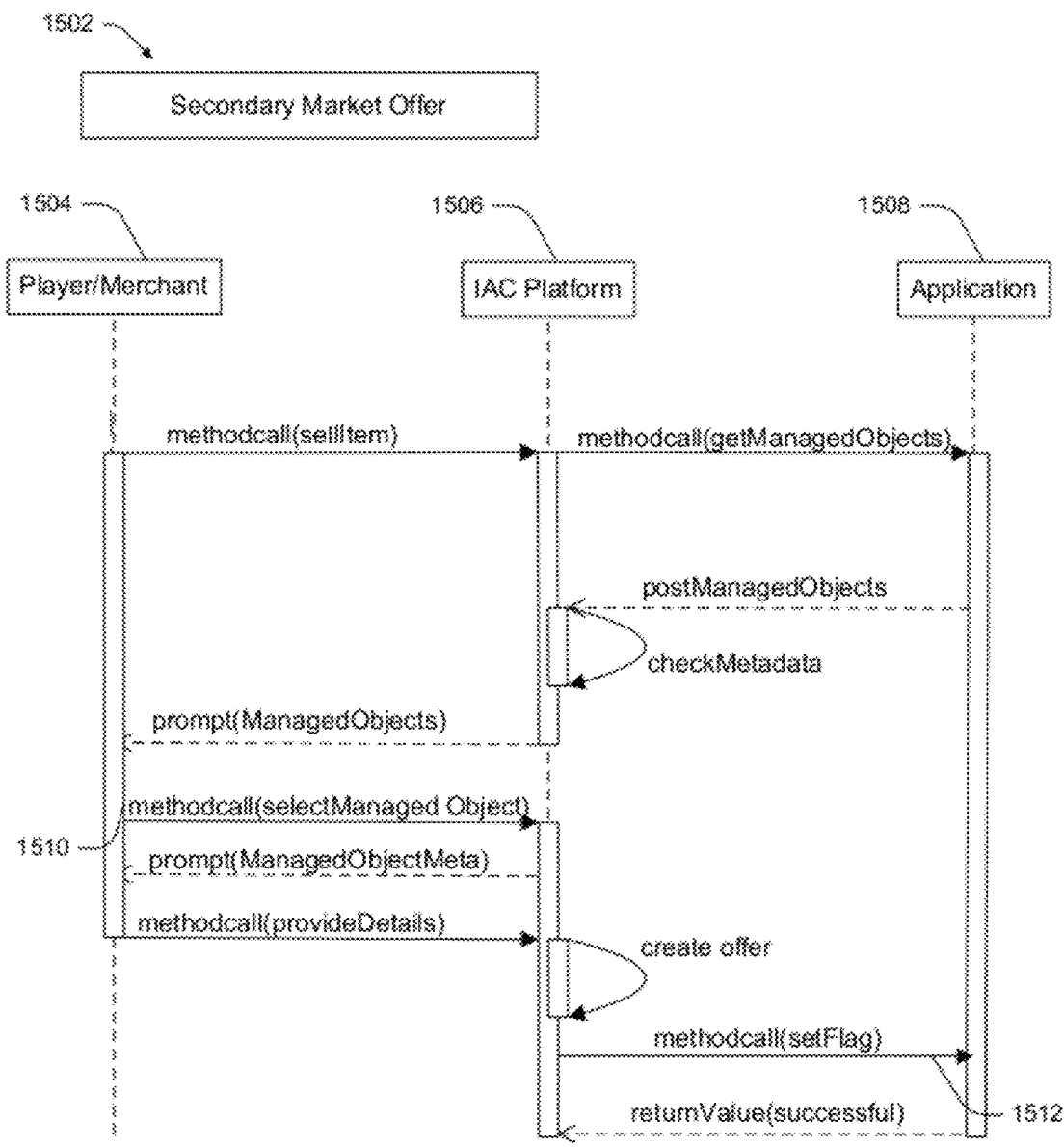
FIG. 15 is a screen shot of an Economy Management page allowing a content manager to create a set of attributes to define an "event id" that determines the item behavior relative to economy management controls.
Figure 16:
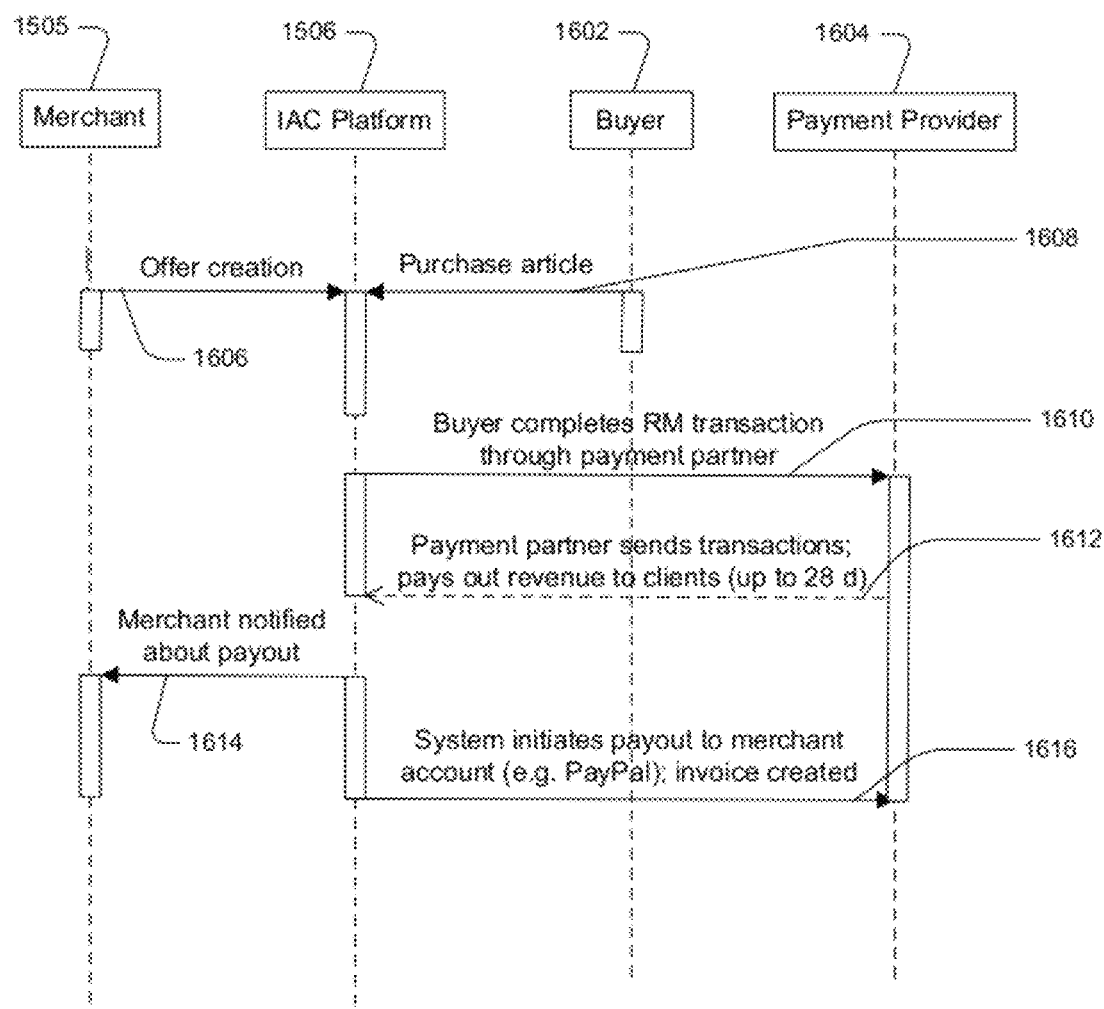
FIG. 16 is a screen shot of a Currency Type Management screen allowing a content manager to define attributes of a currency type.

Offer management and content delivery is realized by a set of APIs as is depicted in FIGS. 15 and 16. The player or person's account must identify him as a "merchant" 1504 in order to sell items. A player wanting to sell one or more of his virtual assets can do this by creating an offer from his account inventory or by creating his own store. The platform checks 1508 via API if the declared item for sale is still in the player's possession. In a preferred embodiment, the item is locked as long as the offer is valid, for seamless and rapid delivery after the trading has been completed. After receiving a successful reply from the in-application commerce platform (IAC) 1506, the auction is set to "active" 1512. A potential consumer is now able to purchase this content item. After the transaction has ended, the platform 1506 verifies again 1510 if (a) the Merchant and consumer have valid accounts, and (b) the object for sale is still in the possession of the merchant. Thereafter, the platform prompts the payment order to the buyer. This step is processed automatically if a wallet is being used. The platform executes the payment process based on the selected payment form. After getting a positive acknowledgement form the payment partner, the IAC starts the entitlement process through an API.

To secure a real money transfer, the platform can offer an escrow service to mitigate the risk of fraud, outstanding delivery or a mismatch of described and delivered quality of items. The platform does this by integrating with a third party escrow provider which safely holds a consumer's payment in a trust account until the entire transaction is completed. Since the consumer pays the escrow and not the merchant, the escrow service can withhold payment until the in-game component has been delivered. Once this has been verified, the escrow provider releases the payment to the merchant. The same result may be achieved using the in-application commerce system wallet, however, holding and withdrawing real money from a wallet might require a banking license.

After a user buys an item, the auction is finished and post-purchase notification services are initiated to inform the buyer and the merchant that the transaction is complete. At this time, the buyer may select "escrow" to begin the escrow process described above, which may involve a small fee to be paid to the escrow provider. If the buyer does not wish to use the escrow services, the payment process continues to completion. The system then sends a notification to the merchant, who reads the message in his inbox or external mail and clicks the embedded link to get information about the successful auction and the delivery process is completed.

FIG. 16 illustrates the payment and settlement process. Clearing and settlement in a secondary market is accomplished with the in-application commerce system acting as the intermediary between the buyer and the seller. The system handles all payments and disputes. The settlement process is executed after the dispute period has passed and both parties have confirmed the successful delivery of the article or the provision of the service. Referring to FIG. 16, the merchant (a private person or player) is registered on the in-application commerce platform and creates an offer 1606. A potential buyer 1602 searches, finds and buys (places a bid) on the offer 1608. The IAC platform fulfills the transaction and begins the post purchase processes. The buyer 1610 selects the dedicated payment form (which can be restricted based on offer filtering and risk class) and provides payment form details to the payment partner 1604. The buyer confirms payment 1612 and executes payment (synchronously or asynchronously) and notifies the IAC platform that the transaction has completed successfully. The IAC platform performs the clearing process 1614, calculating the total merchant and client payout per month. After manual approval the system informs the merchant/client of the payout for the billing cycle and creates a pdf formatted invoice including transaction details 1616. The system informs the payment partner to pay out the dedicated revenue share to the merchant. Based on the payment partner, the merchant may have to accept payment before the transaction is complete. The payment partner then informs IAC about the successful payment. The system closes the transaction in the platform.

Settlement occurs after the buyer has paid for an article. During the 28 days immediately following the transaction (the grace period), the consumer may open a dispute to initiate a transaction rollback. All disputes and chargebacks must be closed by the end of that grace period. The system pays out all revenues through the payment transfer providers (e.g. PayPal or Moneybookers) to authorized users. The system generates a detailed report to be downloaded or accessed through an API. Players and merchants need to register their payout method before any revenues are paid out. Only one payment transfer provider may be attached per account. The attachment requires a preceding authentication process where the merchant must needs to authenticate his account.

All transactions in the secondary market are stored and accessed based on their post settlement status. Statuses include merchant not cashout certified; no merchant contact data available; payout pending through provider; provider failed and rollback status. Either the platform or the application publisher may serve as the Merchant of Record (owner of all payment contracts) in all transactions completed by end users. The dedicated party will be responsible for the clearing and settlement of all transactions as well as the payment of customer's share of the revenue to the customer as specified in the integration agreement. The clearing period may vary among payment forms and clients.

Wallet and Currency Management

Figure 17:
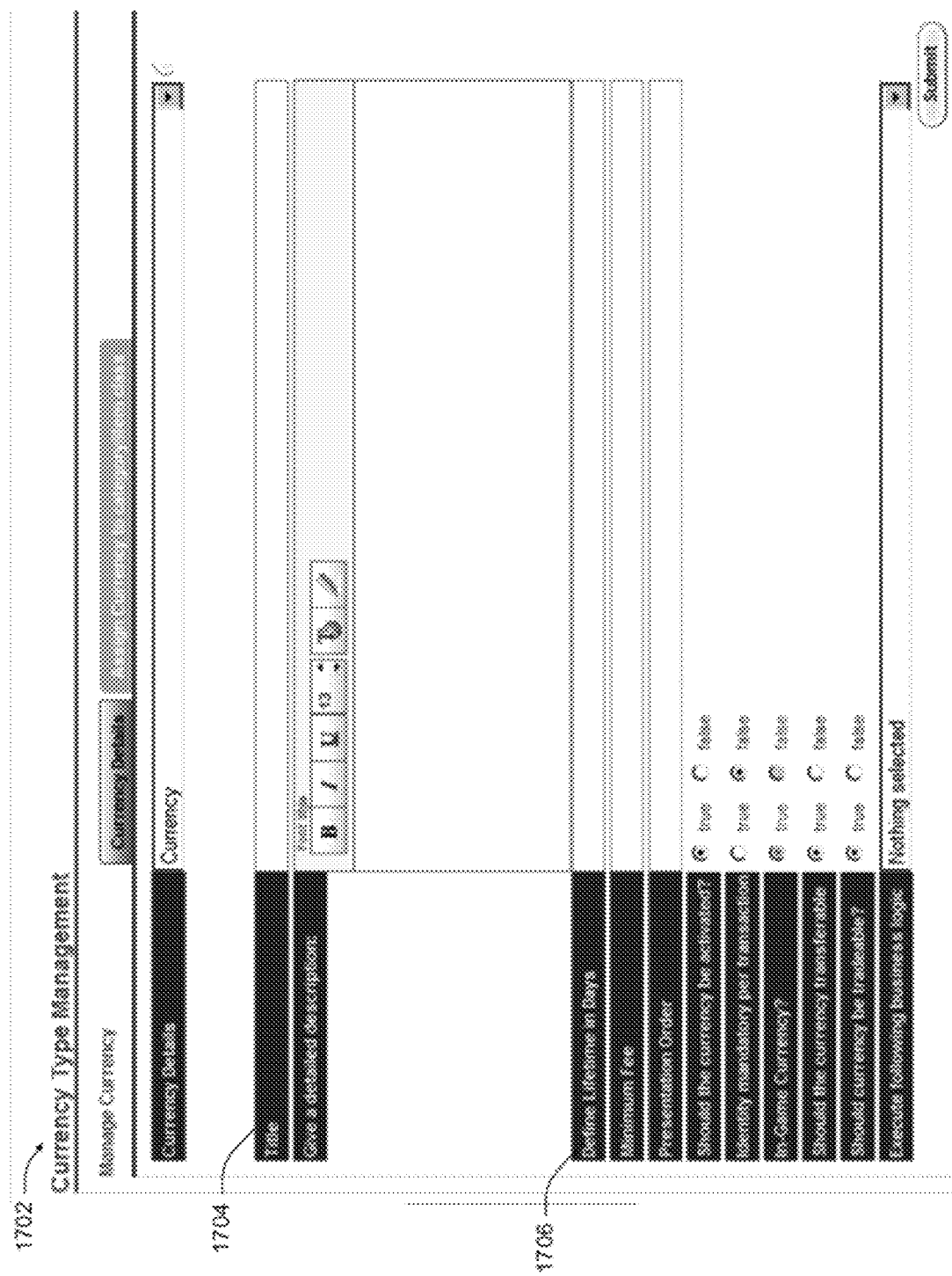
FIG. 17 illustrates the APIs involved in making a purchase in-game, when the wallet does not have sufficient funds.

A wallet 434 and currency management 436 module provides payment services across all use cases in the in-application commerce system. In a gaming environment, both real money and virtual money may be used to purchase real or virtual items. In a preferred embodiment, the in-application commerce system provides both a user interface and APIs that allow an application administrator to create and define currency types. FIG. 17 is a screen shot of the user interface used for currency type management 1702. Currency may be created by choosing a currency title 1704 and creating a description and setting attributes 1706 such as lifetime, presentation order and if it should be activated or be an in-game currency. The content manager may also define whether it should be payable in real money and if it should be tradable in a player-to-player environment. Currency may be assigned to a category/item class by choosing the Assign Currency tab. Business logic for currency behavior may be created and assigned to the currency.

Within the application commerce system, currency types are configurable to meet application requirements. For instance, certain in-application purchases may only be made through "platinum" coins sourcing from a real-money exchange whereas other articles may be bought with "gold" coins that have been awarded for achievements within the application, or "green" coins funded through online time. Application administrators may also define different types of points as currency, for example, loyalty points earned for repeat purchasing or duration of play, promotional points redeemed through a marketing campaign or premium points used to create tiered service models. These different currency types can be flexibly defined by a currency administrator and configured to have clear exchange rates between real money and the different types of virtual currency. Virtual currency can be created and defined by providing information such as that described in Table 7.

TABLE 7

Currency Attributes

| Attribute | Description |
| --- | --- |
| Title | Unique title seen by the end user (e.g. Gold Coins) |
| Description | Internal remark describing the characteristics of the currency (e.g. Loyalty Points) |
| Resellable | Attribute defining if the currency should be bound or allowed to be transferred/sold to another player |
| Loyalty type | Attribute defining if the virtual currency is only for loyalty increasing purposes and will therefore be treated differently within the platform (e.g. CSR permissions, etc.) |
| Lifetime | Attribute defining currency lifetime, allowing currency to expire after a certain period. Relevant for game-play as well as for revenue-recognition reasons |
| Cash-out | Attribute defining if currency should be considered for real money cash-out |

The administrator may also manage exchange rates between real money values and a virtual currency or between different virtual currencies. For example, an exchange rate for a single virtual currency entity can be defined in relation to one unit of a real money currency (e.g. 0.5 US Dollars). Exchange rate between virtual currencies may be achieved through a catalog administration/offer management tool by defining currency packages that can be traded against other types of virtual currency units.

An offer management tool allows administrators to set a relational dependency between item classes and virtual currency types. This allows the administrator to steer the offering and to define if certain item classes (e.g. items, coins, service, etc.) can be bought by real-money currency and/or a specific virtual currency or a combination of both. The offer management system also supports bundling for recurring wallet funding and combined pricing where offers are priced in multiple virtual currencies.

Wallet management involves managing the user's balances, including funding flows with multiple payment providers, real-money cash-out and synchronization with existing wallet systems. The under-18 user segment is an important market segment that is challenging to monetize because of their lack of access to convenient payment methods like credit cards. A preferred embodiment allows parents to create and authorize multiple child accounts to use their balance, set spending limits and view purchase activity. In addition, offer management allows the publisher to make use of in-store cards or electronic vouchers that can be purchased with cash or by a parent to fund a child's wallet account.

The wallet exposes a set of interfaces allowing external components to trigger adding or deducting funds from the wallet. These "external components" could be the in-application ecommerce system's transaction management backend but also any other application-server or external payment or transaction processing solution. To optimize the user-experience, every request to the wallet is verified for sufficient funds before a transaction process is initiated.

The wallet is additionally designed to allow converting virtual currencies into real money and trigger a payout to the customer via approved channels. Real money cashout is an optional wallet component and built in a way to minimize all related financial risks. This includes a sophisticated exchange rate management and a set of tools to identify and prevent cases of money laundering, fraud, arbitrage management and inflation. As for the other wallet components, the cashout function is configurable with a set of rules, allowing, for example, to cash out only certain types of virtual currencies, introduce a minimum threshold for a payout, etc.

Wallets containing virtual currency may be funded by credit card or loyalty programs, or may be acquired in-game. Since the value of virtual currency may change over time and for liability purposes, value is tracked using the first-in-first-out (FIFO) (first in, first out) accounting method.

Access to virtual currency is handled in a manner similar to a credit card or bank account. When the user submits an authorization request to pay by virtual currency, a hold is put on the appropriate number of virtual points. This process segregates the authorized funds until the item has been paid for or the order has been canceled and the funds released. It also prevents the user from inadvertently "double spending" the virtual currency.

A virtual currency exchange service allows a real world currency value to be associated with every unit of virtual currency. This allows the commerce platform to display the transaction currency/virtual currency to the user, but base its calculation for costing, tax, shipping and margins on the real world currency. The real world value can be passed to the appropriate commerce engines to complete the necessary calculation.

Attaching the real world currency also allows the fraud engines to perform as they do based on the applicable real world currency and it also allows for additional rules to be formulated that center around the virtual currency. Completing chargebacks, returns and refunds are based on the real world currency versus the virtual currency but present some challenges when crediting virtual currency to the users payment account.

In all situations the application chooses which value is displayed or if both are. For instance, where virtual currency is being used to complete the transaction it may be desirable to display the virtual currency value of the transaction and not the real world value as the shopper may not distinguish between the two, but in a fraud detection scenario viewing both currencies may be beneficial to a person analyzing the account in a fraud detection process.

To deal with the issues of changing value of virtual currency the wallet will put a date time stamp with the transaction. First in-first out (FIFO) accounting policies are then applied, which require the system to scroll through the virtual currency tables to pull the "oldest" currency for redemption. Furthermore, it also require the system to "put back" in a chargeback, return and refund scenario, the aged currency so it is compliant with the FIFO scenario as the currency being returned may have a different value than the currency currently in the wallet.

As was discussed earlier, virtual currency is often purchased with real world value or currency. Because of this, policies are required for accurately accounting for inventory and transactions related to virtual currency. For example, in the United States of America, state laws require companies with remaining account balances to escheat to the state after a number of years of inactivity.

Wallets may be funded with real or virtual currency; however, only virtual currency wallets may store virtual currency. Currency types may be mixed within the account, but not within a wallet. The system also supports funding via gift card or retail cash card. Wallets containing virtual currency may be funded by credit card or other payment method, or may be funded with currency acquired by loyalty programs or game play. Since the value of virtual currency may change over time and for liability purposes, value is tracked using the FIFO (first in, first out) accounting method.

In addition to virtual currency, the system supports the storage and handling of real-money stored value in multiple currencies. To comply with legal and financial requirements, the storage of real-money values has essential impact on multiple functions and use cases, including currency and exchange rate management, tracking and reporting, chargebacks, refunds, customer care and anti-fraud management.

To accommodate these requirements, exchange rates for real-money currencies are fetched directly and real-time from payment partners' central currency database. Storing value entities according to FIFO principles, as discussed above, ensures tracking of the actual real-money value in relation to the actual transactions, enabling correct revenue recognition and financial reporting. Chargebacks are calculated according to the actual currency value at the time of the transaction. In a preferred embodiment, a customer may request a refund or rollback of a virtual transaction by viewing transaction history and choosing to request a refund or report a problem with a particular transaction.

To limit the potential of internal fraud, the customer care tool 332 allows administrators to restrict access to real-money refunds to selected or few Customer Service Representative. Based on the respective access rights, a particular selected Customer Service Representative can view account-related information, view transaction-related information, view and manage purchases (e.g. accept refunds, goodwill funding, etc.), view and manage fraud and chargeback cases, and edit wallet accounts (change default billing and shipping address). The Fraud module 336 manages fraud at both the transaction and account level, enabling mitigation of fraud risks when storing real-money value. Internal APIs perform balance updates after a purchase is made or a chargeback is performed. In addition, if game commerce account-level fraud systems track chargebacks, the fraud systems are updated after a chargeback is credited to a user account.

In a preferred embodiment, the account system interacts with three systems: the social game application, ecommerce and in-application storefronts, and billing and customer management systems. The application may be integrated with the wallet account system through a standard set of Wallet Web Services, implemented through SOAP web services. The communication from and to the web services is achieved over the HTTPS (secure HTTP) protocol, and data is passed in XML format.

The trading platform (ecommerce and in-application storefronts) provides a comprehensive and robust platform to design and manage both primary stores and secondary market merchant stores and accounts. Both primary and secondary market modules may be integrated with the wallet account system for buying and selling purposes. The wallet is also easily integrated into third party store components or existing commerce infrastructure modules.

For handling real money transactions as either stored value or as virtual currency exchange, the wallet is integrated with a billing and payment system (i.e., the order management system). This can be a platform-related system or a third party integration.

The wallet management system enables application publishers to execute multiple business rules to fund or debit participant's wallet account (at both the user account and the identity/character levels) through several virtual currencies as part of game-play. Funding functionality is supported by the wallet web services. To fund the wallet, at least the following parameters must be provided: account id (for user/player/identity), currency id (for currency type), order id (generated for every transaction), amount, keeping class (defines if the amount should be credited or debited) and security key (authenticates the publisher).

Based on the SOAP/XML response, a success notification response or an error message will be returned (e.g. invalid currency id, not allowed, account disabled, account ID wrong, etc.). The secondary marketplace component allows players to buy and sell in-application items, virtual currency, and services. A merchant who is selling a digital product can receive his purchase price as virtual currency. Based on the existing currency types, the middleware will debit the buyer's account fund in the merchant's wallet account. Currency may be purchased for real money based on the exchange rate between virtual currency and real-money the system will manage the transaction. To maximize revenues and optimize the user experience, the wallet may be configured with a default billing and shipping address to enable accelerated checkout process with a single click purchase. Coupons may also be used to load the wallet. If a transaction detects that there is not sufficient currency in the wallet account, the system enables consumers to easily add funds.

The wallet can also be debited from within the game. This can be achieved by invoking the same web services as the account funding process with different parameters. To debit the wallet, at least the following parameters should be provided: account id, currency id, amount and keeping class (debit or credit). The platform supports an authorization call to pre-check if sufficient funds are available and to reserve a certain amount before fulfilling the purchase. This is especially relevant if the purchase process is asynchronous (accommodates related processes like credibility checks, address validation, etc.). A second API call allows settling the authorized amount to continue the purchase process or to free up the reserved amount. If a user tries to buy or pay for an article or service through the secondary marketplace the system simply tries to debit the wallet, because it already knows which currency type needs to be charged. If the wallet account does not have enough of the required currency, the application developer can enable purchase of additional currency (based on the settled exchange rate), which can be initiated manually (by the player) or automatically (by the application).

Regardless of the services offered in the application, the most efficient way of handling a high volume of low-value transactions is to introduce a virtual currency and related exchange. A wallet/virtual currency can be used to handle micro-transactions within the game, allowing players to accumulate a considerable amount of virtual currency, which can then be exchanged into a real-world currency.

To discourage money laundering, inflation and arbitrage a management, it is necessary to keep exchange rates between virtual currencies and real money stable or at least in tight control. To eliminate any of those risks, the game's payment mechanism can be designed as a "walled garden" allowing the purchase of virtual currency but not allowing cash-out back to real money currency.

However, for some games and applications, it is important to provide users with the ability to convert virtual currency into real money (e.g. for user generated content). Since the system can identify the exact origin of every virtual currency piece, it is possible to allow the conversion of the certain currency-types only (e.g. the currency entities that the user accumulates through in-application trading). The exact settings can be defined through an administration tool An administrator can limit currency types allowed to cash-out and set the exact exchange rate between the virtual currency and the real money currency to counterbalance potential inflationary trends.

The following examples of wallet transactions may serve to illustrate some of the features and concepts described above. In this first example, a game player logs into a free-to-play MMORPG (Massively Multiplayer Online Role Playing Game) called "Game." Game has chosen to monetize its player-base using a wallet-based virtual currency, "Game Points." Four types of currencies have been configured: USD (US dollar real world currency), EUR (Euro real world currency), GOLD (ingame currency earned through play) and GAMEPOINTS (currency purchased with USD or EUR and redeemable for in-game content). Depending on their location, they are presented with the appropriate USD or EUR price which is currently $5 or € 4 for 500 points. The Game storefront is embedded entirely within their desktop game client.

Figure 18:
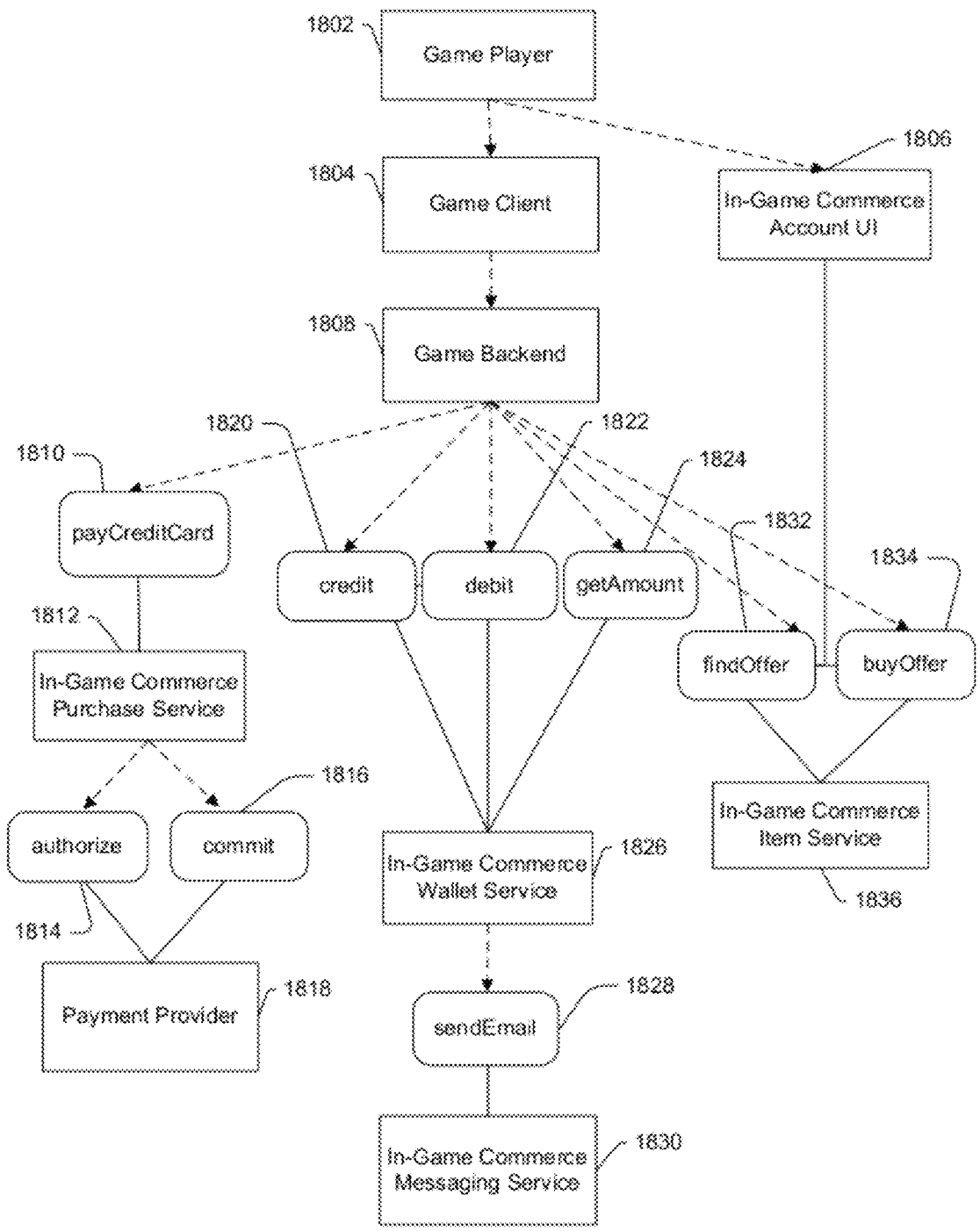
FIG. 18 is a sequence diagram of the process of funding an account.

FIG. 18 illustrates the high level architecture and modules/services used in performing the depicted functions. Players 1802 interact with the game client 1804 on a computing device such as a PC or phone. Players 1802 access the in-game commerce account interface 1806 using their single-sign on credentials. The player locates the offer 1832 for Game Points and selects it for purchase 1834. The item service 1836 provides the game producer with the ability to set offers for points in any desired package amount. Game accounts are funded by purchasing Game Points with real money using an API 1810 that interfaces the game backend 1808 with the in-game commerce purchase service 1812. Credit card transactions are processed through the payment module to the payment provider 1818. These transactions require APIs that authorize 1814 (funds are available and held until purchase) and commit 1816 the payment. Upon commit, Wallet Service APIs apply the purchased points to the user's Game Points wallet and update the points balance 1820. Notification is sent to the in-game commerce messaging service 1830 to send an email 1828 to the player to confirm the transaction.

Figure 19:
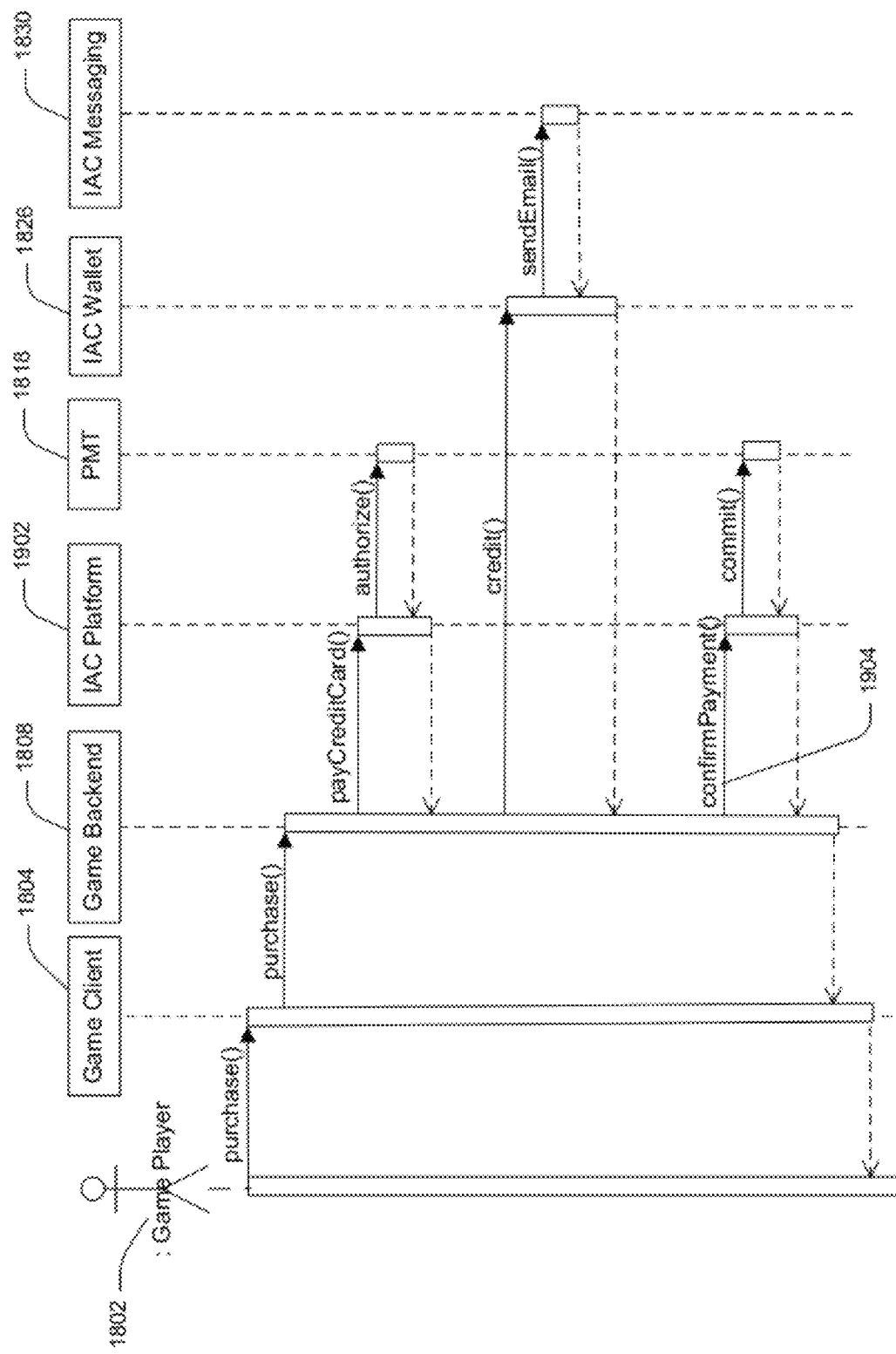
FIG. 19 is a sequence diagram of the process of purchasing content.

Referring now to FIG. 19, Pete the Player 1802 wishes to purchase additional Game Points for future use. From within the Game desktop client 1804 he goes to the in-game storefront and selects the $5 point package. The client makes a request to the secure back-end 1808 which initiates a payment 1902 using Pete's stored VISA card information. The payments engine 1902 submits the transaction to the payment provider 1818 for authorization. After receiving a successful response, the Game back-end then credits Pete's wallet 1826 using the Wallet API 1820 which triggers a confirmation email 1828. The Game back-end 1808 completes the transaction by calling the confirm Payment API 1904. Pete now has access to the 500 Game Points he purchased and has been charged $5 on his VISA. With Game Points in his wallet, Pete may now purchase content in-game.

Figure 20:
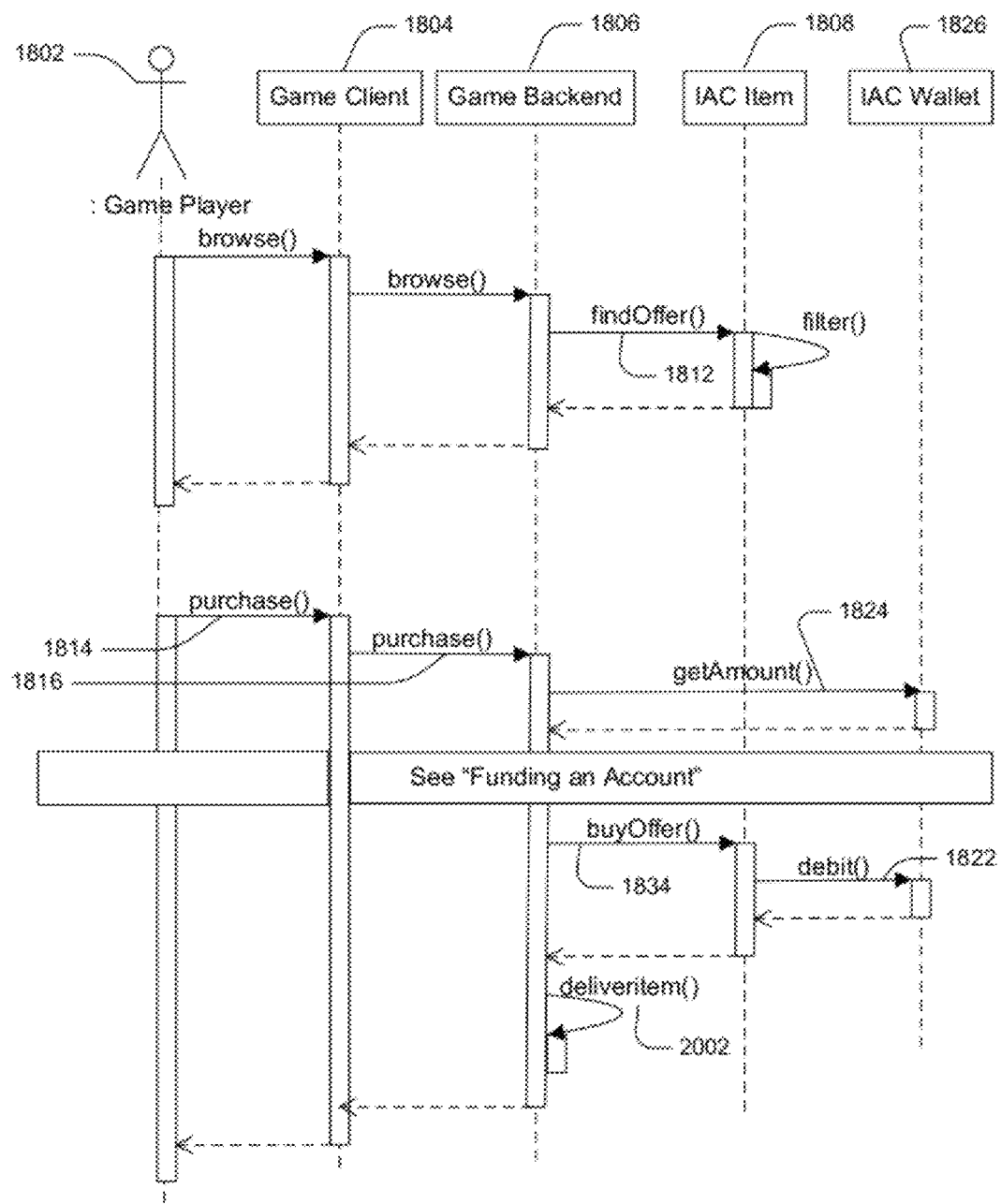
FIG. 20 is an exemplary process for creating a child account prior to creating a parent account.

FIG. 20 illustrates a purchase from within the game play. From the Game in-game storefront, players 1802 can purchase content ranging from enhanced gameplay features to weapons and armor using Game Points. Pete would like to purchase a horse for his Game character to get around the world faster. He navigates to the in-game storefront on the Game client 1804. The Game back-end 1806 retrieves the list of available offers from the ItemService 1836 which applies the configured filtering rules for Pete's character's level and account status. Pete selects the horse offering for 700 Game Points 1904. The Game back-end 1808 activates the wallet web service 1826 to check Pete's account balance 1824 and determines that he doesn't have sufficient Game Points, so he is offered the option to purchase 500 Game Points for $5. After his account has been funded, the back-end submits the purchase to the ItemService using buyOffer 1834 which debits 1822 700 Game Points from his wallet 1826. Upon receiving the success response, the Game back-end delivers the item to his account 2002. Pete now has the horse in his inventory and has the remaining 200 Game Points in his wallet.

Reverse Wallet and Microtransactions

A reverse wallet accommodates microtransactions for real money. With a reverse wallet, every shopper account gets a personal threshold assigned which defines how much money s/he is allowed to spend in advance before the system clears the wallet. The threshold is based on the shopper's behavior and may be adjusted frequently. Clearing of the wallet may be initiated by time or by exceeding the threshold. With an accurate personal profile and threshold, micro-transactions with price-points below 1 USD/EUR are possible and convenient.

The in-application system and method reverse wallet provides a system and method capable of assigning a personal threshold per user and wallet. The fraud defender system influences the threshold of the account holder directly by increasing or decreasing the threshold depending on various configurable factors. Both real and virtual currencies are supported. In addition, the threshold may be managed with an administrator console and per API on an account level and in general. The system supports multiple payment methods (i.e. credit/debit cards, PayPal, Click&Buy, etc) with an option for a credit wallet. It should be configurable to support reverse and top wallet per client. This means that this functionality can be disabled for particular users(shoppers) or according to the fraud score associated with the user account. If its disabled, the user is only able to load the wallet first before he/she can spend the virtual funds.

Describing the reverse wallet in terms of an exemplary use case of debiting the wallet, the primary actors are the commerce platform, the shopper/end user, a threshold engine and a customer service representative (CSR). The commerce platform takes orders and contains business rules regarding when an order is released for fulfillment. The shoppers place orders on the site. They pay using payment methods, such as credit cards, Paypal, etc., request refunds and make cancellations. The threshold engine calculates the threshold based on the shopper's fraud or risk score and the values allowed for particular risk categories as determined by the administrator. A CSR may become involved with the process, performing actions on the shopper's behalf.

Figure 21:
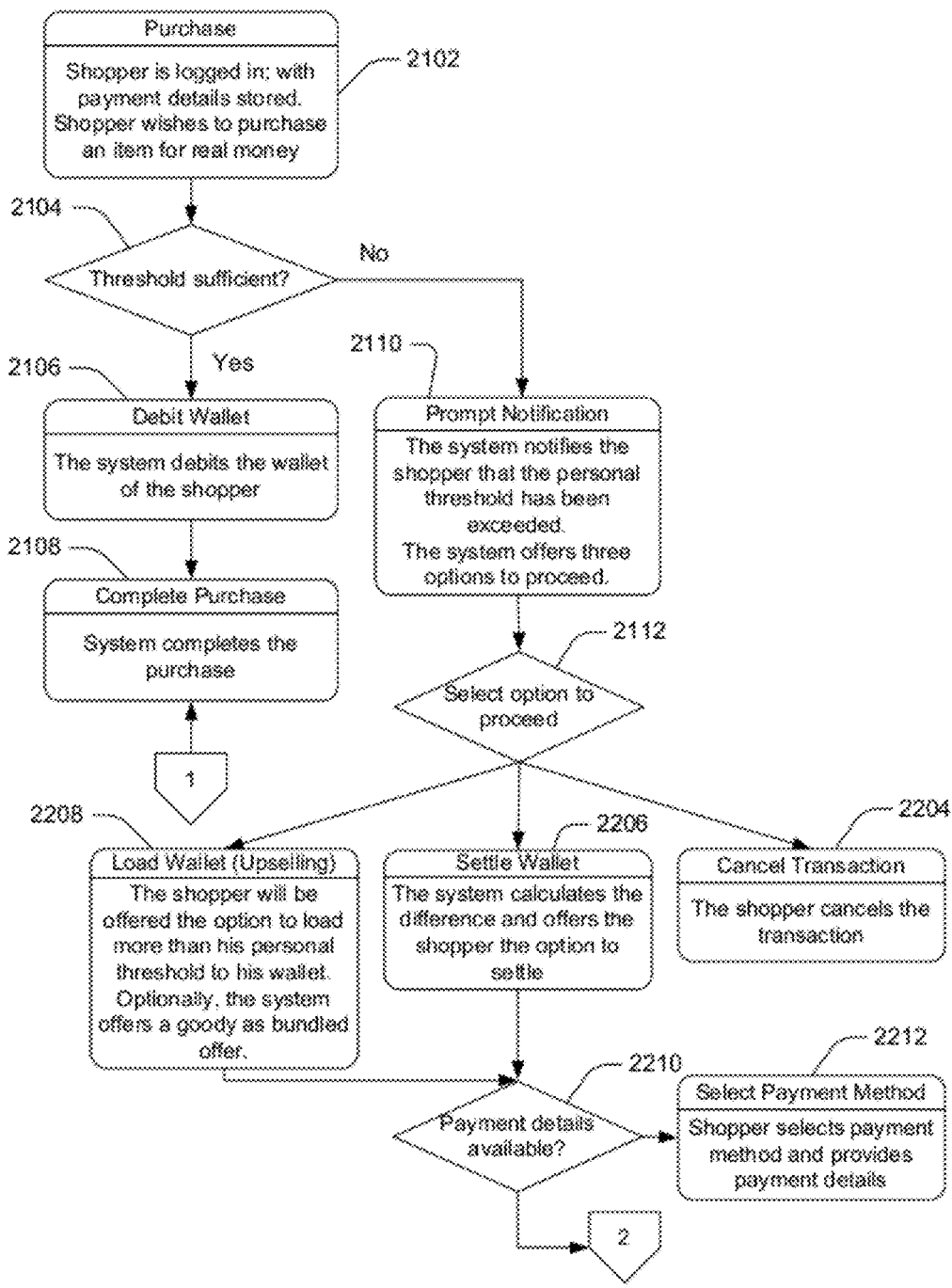
FIGS. 21 and 22 illustrate the process flow of reverse wallet functionality.
Figure 22:
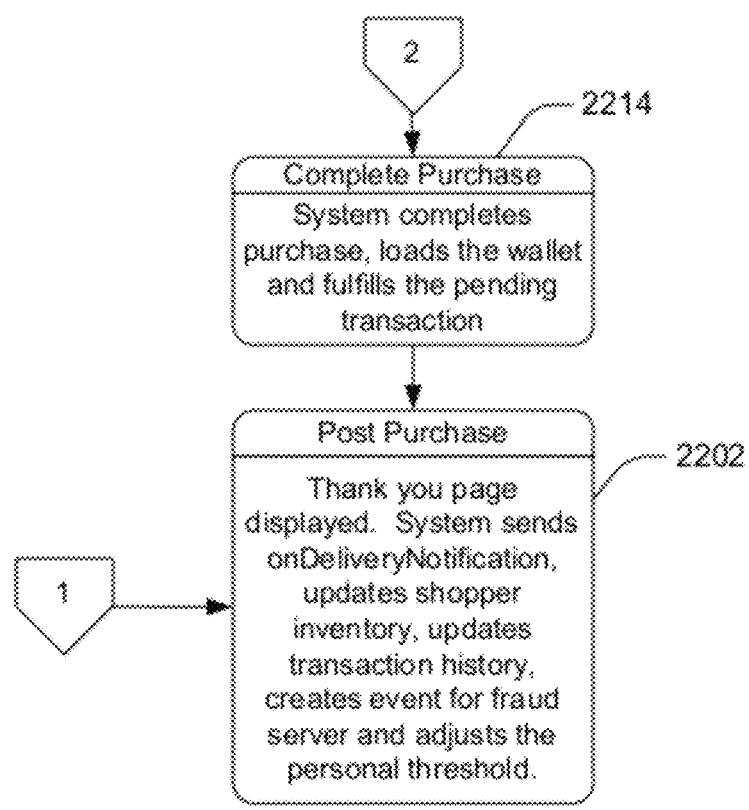

A wallet should be enabled for both real and virtual currency and the user registered, with payment details available and stored. The thresholds should be assigned for each risk class, and not exceeded for the shopper's account. An example is provided in FIGS. 21 and 22. Referring to these figures, the shopper indicates that s/he wishes to make a purchase with real currency 2102. The system checks the threshold for the shopper's risk class 2104. If the purchase price does not exceed the threshold, the system debits the wallet 2106 and completes the purchase 2108. The system then performs post-purchase events, such as displaying a thank you page, sending an on Delivery notification (see Table 18), updating shopper inventory, updating transaction history creating an event for the fraud server and adjusting the personal threshold as required 2202.

If the threshold is not sufficient to cover the purchase price, the system notifies the shopper that the personal threshold has been exceeded 2110. Options are offered the shopper to proceed with the sale 2112, and the user selects the desired one. Options to be presented to the user are configurable. Exemplary options include cancelling the transaction 2114, settling the wallet (the system calculates the difference and offers the shopper the option of settling) 2116, and loading the wallet (the shopper is offered the opportunity to load more than the personal threshold to the wallet 2118). If the shopper chooses either to settle or to load the wallet, the system checks to see if payment details are available 2120. If not, the user selects the payment method and provides payment details 2122. Otherwise, the shopper completes the purchase 2202 and the system performs post purchase events 2204. Exceeding the threshold and the subsequent options may trigger an increase in the fraud score of the shopper.

If a user is not registered, s/he may provide account details to create an account. The system may check the IP address to see if it is already attached to an existing account, and if it is, whether the account is active or inactive. After the account details are submitted, the system creates an account and sends the user an email with an activation link. The user is redirected to an account activation page. The shopping continues with the registration process by providing additional account information such as billing address and payment details. If the payment details are in use and assigned to another account, the system will increase the user's fraud score resulting in a low threshold.

Microtransaction debits of wallets with positive balances are available when the threshold assigned to the shopper based on the shopper's risk score is exceeded. After a user selects an item to purchase and clicks a "buy" button to complete the purchase, the system checks to see if the shopper has exceeded his threshold, and, if he has, the shopper is notified about the threshold limit violation. The system may automatically fulfill the purchase, clear and debit wallet transactions in chronological order, and then performs post-transaction processing 2202. If payment details are missing, the purchase may be cancelled, or the shopper will be afforded a chance to add the payment details 2212. If payment details are not correct, for example, if the shopper's credit card has expired, the shopper is afforded a chance to correct the details or select another method, and proceed with the process.

A virtual money wallet may be debited for microtransactions using reverse wallets as well, using a process similar to that used to debit a real money wallet. One click purchases for virtual microtransactions may be processed instantly. However, if a user selects an item which will exceed the threshold, the user is notified that the purchase will violate the threshold limit. As with real money, the shopper may be offered an alternative, in this case the ability to select a more expensive virtual currency package as proposed. If the shopper doesn't intervene, the system automatically fulfills the purchase. This means that when the shopper doesn't do anything, the purchase of virtual currency is fulfilled. It will be appreciated that the shopper must confirm to clear the wallet. The shopper is also able to cancel the transaction and select another offer which does not hit or exceed this personal threshold. The system clears and debits the wallet in chronological order and updates the fraud score and sets OnDeliveryNotification call. If payment details are missing, the user may cancel the purchase or supply the missing details. If the purchase is cancelled, the system will change the status of the transaction and update the user's fraud score. If the user provides the payment details, the system stores the details for future purchases and automatically fulfills the purchase. The system then clears and debits the wallet in chronological order, updates the fraud score and sets the OnDelivery Notification call. If the payment details are not correct, for example, if the credit card has expired, the system receives a credit card expiration error response and makes a second attempt using an expiration date in the future (e.g. stored value plus 3 years). If the transaction is successful, the system automatically fulfills the purchase, clears and debits the wallet in chronological order, updates the fraud score and sets the on Delivery notification. If the payment details are not correct, but are provided by the shopper or a different payment method is selected, the system presents the terms and conditions for user acceptance, stores the details for future use and completes the process as above. As such the virtual wallets are always cleared with each transaction. In the case that the shopper wants to purchase an offer that crosses the threshold and the system prompts him to clear the wallet, the system will clear threshold and completes the purchase of the offer in a single step (from shopper point of view).

A real money reverse wallet may be cleared automatically by time or by detecting an exceeded threshold. A time period may be defined in which all wallets need to be cleared. When that time expires, the system automatically fulfills purchases to clear the wallet for any account/wallet with a negative balance. A purchase confirmation is sent by email to the shopper. The system clears the wallet and updates the fraud score. An on Delivery notification call is then sent. If payment details are missing or are not correct, the transactions proceed similar to the transactions above for debiting the real money wallet when insufficient funding is available.

Some features may be alternatively performed by a customer service agent (CSA). As was mentioned above, fraud scores are updated frequently as per the rules configured by the game publisher. As the scores are updated, the threshold is updated to the threshold configured for the fraud classification identified by the user's fraud score. However, the threshold for registered users may also be updated by a CSA. The CSA may log into an administration tool, and increase or decrease the threshold. The system captures information regarding the change, such as the name of the CSA, a timestamp for the change, the previous and new thresholds, and a reason for making the change. As soon as the CSA saves the changes, the new threshold becomes available for the user. The CSA may also manually initiate a wallet clearance.

Parent-Child Relationships

Players and purchasers under the age of 18 are an important market segment that is challenging to monetize because of their lack of access to convenient payment methods like a credit card. To facilitate responsible application participation by children, accounts may be set up with parent-child relationships. This is particularly important for accounts on gaming sites, which allow parents to constrain their child's time and money spending. The parent-child controls allow the parent to control financial and operational details of the child's interaction with the game. In one representative environment for an in game commerce system, parent-child relationships apply to both user accounts and wallet functionality. Parent-child account relationships empower parents to control the online time budget of their children and control their child's real money spending within an online game. The owner of the parent account is empowered to define an exact rule set applicable to one or more related child accounts. This control can be achieved through various features, including determining which currency the child is allowed to use. In this parent-child relationship, various limits can be set for the child account, including: the maximum amount per month s/he can spend, maximum amount per transaction, whether the parent wallet is automatically refunded if a balance is insufficient, and the time budget allowable for the child to consume within a particular time frame. Additionally, the parent has total insight into the transactions, login history and the online time of the child account and can prohibit access or spending allowance at any time.

Figure 23:
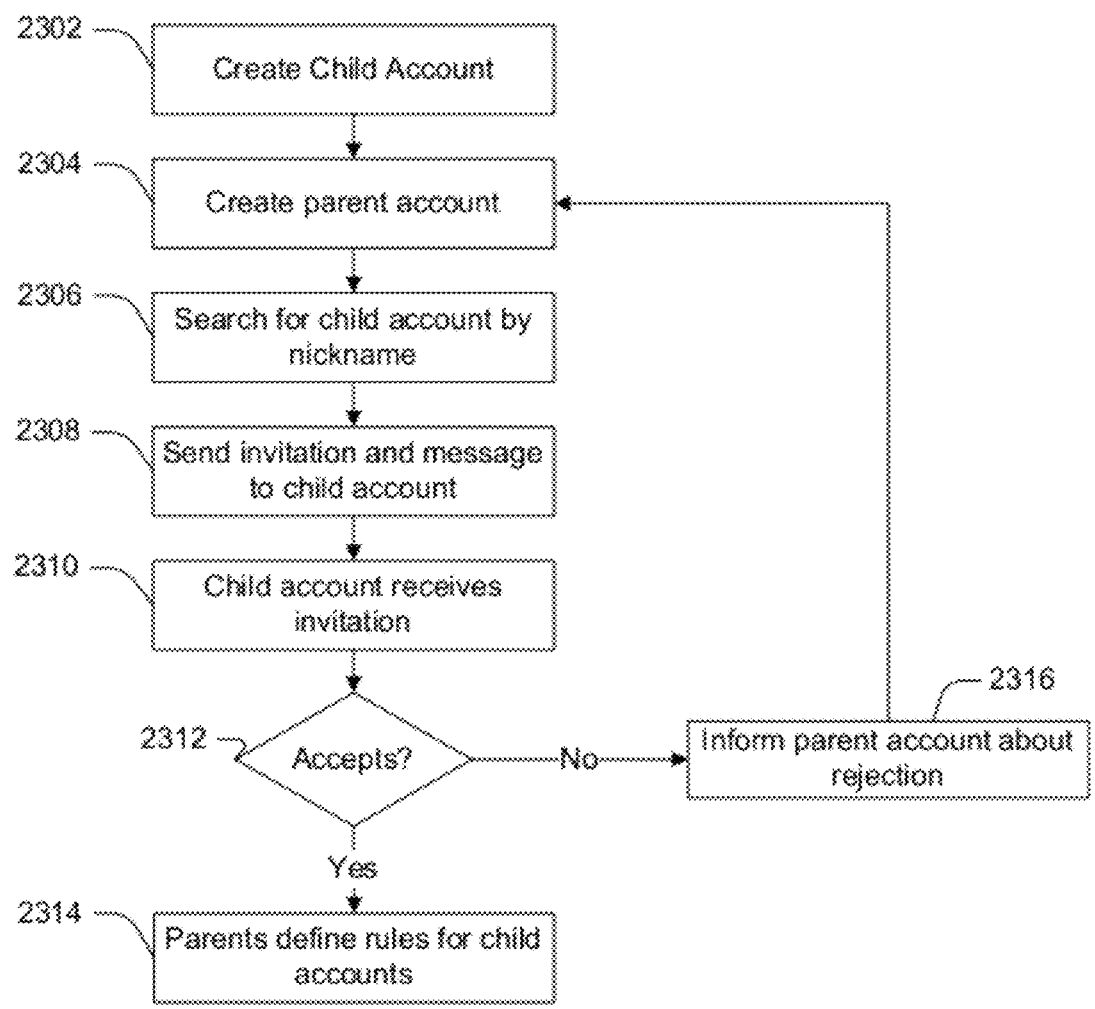
FIG. 23 is a screen shot of a process of creating parent-child relationships within the web client.

FIG. 23 illustrates one embodiment of a process flow for creating the parent-child account relationships. To create the relationship, a child account must exist 2302. A parent may log in and create his/her own account 2304 and then search for the child's account by nickname, or other identifier 2306. The parent (or other appropriate adult, generally someone over the age of 18) sends an invitation with a message to the child, who will get an invitation in his inbox 2310. The child may either accept 2314 or decline 2316 the invitation. If the child accepts the invitation, the parent may then define rules for the child's accounts using their settings screens.

The message sent by the parent 2308 may be a personal message or an external message. A personal message may contain a message directly from the parent to the child and a standard explanation about the parent-child relationship. A button on the message allows the child to confirm or reject the invitation. Clicking the button opens the personal message editor, and the child may create a response message to return to his/her parent. An external message contains the personal message of the parent and a standard explanation about the parent-child relationship. It also contains a link to confirm and a link to reject the invitation. Clicking the link directs the user to his or her message editor where he may compose a return comment. Various fields, such as the receiver and subject fields, may be prepopulated when the child clicks the button or link.

Figure 24:
FIG. 24 is a screen mock up for creating a child profile.
Figure 26:
FIG. 26 is a screen mockup of a confirmation screen following successful creation of a child account with permissions.

FIGS. 24 to 26 illustrate an account settings page used to set up a parent-child relationship and configure the child's account as desired by the parent. In a preferred embodiment system, a "Settings" tab contains all the features required to configure child accounts with parental controls. For example, the first section 2402 allows the parent to enter the identifying information for the child. The next section 2502 allows the parent to set rule-based permissions, including amounts per transaction and per month 2504, and the cumulative length of time the child is allowed to spend playing the game each day or over the weekend 2506. An age restriction setting 2508 allows the parent to set or disable payment forms by country. The final section 2510 allows the user setting up the account to send a personalized message 2508 with the notification. FIG. 26 illustrates a notification of a successfully configured child account.

Those skilled in the art will recognize that there are alternative process flows for setting up parent-child relationships and alternative features may be added for which parents would control the in-application behavior of their children. For example, a parent account may be created before the child account. In this scenario, the parent account is already activated. The parent creates a child account and defines permissions for that account. The parent may send an optional notification message to the child account. The parent may create additional child accounts, if required, and assign permissions for those accounts.

This parent-child relationship defines the use of the wallet of the parent account. No fund mergers or user control are fulfilled. Depending on the applied business logic, if a child account already has a wallet fund, it may be used before the parent wallet is debited. In addition to defining the time the child is allowed to spend in the online game per day and/or per month, the parent account owner may also assign a set of permission/rating roles on a child account level. These roles limit the type of content the child account owner is allowed to access. Finally, the parent-account owner is allowed at any given time to change the defined budget (time and/or money) or cancel the relationship altogether. Any of these changes will cause the dedicated history to be stored and made accessible in the activity section of the parent's account. If the relationship is canceled, the child account owner will receive notice through a personal and an external message.

The child account owner may use the parent's wallet account after consuming the balance of his own wallet, depending on application settings. All transactions are stored in the child's transaction history. Transactions charged to the parent account wallet are identified as such on the activity history.

An admin user interface has a view to a wallet balance including all child account transactions. The same detail as the parent account owner is presented in his web client account. In addition, a tab "Child Account History" lists the complete login and online time history structured in the same detail as the parent account owner in his/her web client account. The admin may change child account permissions and login rules on behalf of the parent account owner. Additionally, the parent-child relationship may be canceled via this view as well.

Exemplary Embodiments

Because of its highly modularized nature and comprehensive set of web services, an in-application commerce system and method allows the application publisher a great deal of flexibility in choosing the services that best suit its implementation. For example, if a publisher only required use of the wallet functionalities, the wallet, user management, reporting, customer care and wallet configuration modules and services would be enabled. A publisher wishing to implement an online store with a world class payment gateway would have the following modules enabled: user management/account system, payment gateway and taxation, primary market store, reporting/analytics and clearing, settlement, and invoicing.

Web Services and Interfaces

Web services provide a standard framework for distributed systems to communicate with each other. A preferred embodiment of an in-application ecommerce system and method exposes a large number of interfaces to the application. These interfaces can be grouped according to the general type of service they support. For example, services that facilitate account management include account service, inventory service, wallet service, messaging service and mail service. Services supporting storefront management include item service and search service, and services supporting purchasing include trading service, purchase service, post purchase service, fraud service and settlement service. Web services for processing payments may include adapters for each payment provider according to system requirements. Each will be discussed further below.

All access to web-services preferably requires encryption in the form of secure socket layer (SSL), IP whitelisting or a dedicated virtual private network (VPN). Test systems may use a self-signed certificate that the application adds to their certificate store in order to access the environment. System to system authentication for all the application platform web-services follows a generic pattern. Each web service request includes a "key" element with the parameters such as those listed in Table 8. Only the "key" attribute is required, but it's strongly recommended that the optional parameters be provided to enhance traceability of transactions for fraud detection and system debug purposes.

TABLE 8

Authentication

| Parameter | Req'd? | Type | Description |
| --- | --- | --- | --- |
| key | Yes | Object | Encapsulates security token information. |
| key.accountId | No | String | The system account ID of the caller. |
| key.ip | No | String | The IP address of the caller. Used for security analysis and traceability. |
| key.key | Yes | String | A credential used to authenticate the caller. Configured when the system is setup. |
| key.uuid | No | String | Unique request ID. If provided, subsequent requests with the same UUID will be ignored. |

Account Service

An account service offers a variety of services, including, but not limited to, create user accounts, activate/deactivate users, view or modify customer profiles, view or modify risk profiles, upgrade user accounts to merchant accounts (for player-to-player trading). A remote account services module may require the use of a key to be used when calling the services via account services APIs. All requests are handled via web services (WSDL and SOAP).

The account service is used to manage user profiles within the application platform. An account profile exists in the platform for all users including: system accounts (storefront servers, client back-end servers), back-office users (customer care users and system administrators), and consumers. Consumer accounts may have one or more identities in their account profile that can be used to represent sub-accounts within your applications. For example, an identity might exist for each avatar owned by a player.

An Account Service manages user profiles, including system accounts, such as storefront servers and client back-end server accounts, back-office user accounts including customer care user and system administrator accounts, and consumer accounts. Consumer accounts may have one or more identities in their account profile that can be used to represent sub-accounts within your applications. For example, an identity might exist for each avatar owned by a player.

A number of methods are used in a preferred embodiment of an Account Service and are listed in Table 9.

TABLE 9

Exemplary Account Services Methods

| Method | Description |
| --- | --- |
| getCredentials | Retrieves user credentials |
| ping | Renews the session of a user |
| deleteAddressDetails | Marks the address details of a user as deleted; however, they do not get physically deleted |

TABLE 9-continued

Exemplary Account Services Methods

| Method | Description |
| --- | --- |
| getAccountDetails | Fetches the account details of a user. |
| setPaypalAccount | Stores the default Paypal account for the user |
| loginAndHandshake | A combination of two calls. Used for SSO. The user gets logged in and then receives a token for SSO logins |
| login | Logs a user in to the system |
| createAddressDetails | Stores address details for a user |
| findCurrency | Get default home currency for a particular user account (USD for US citizen) |
| getCustomDataDetails | To fetch all available custom details of a particular account or bulk request. |
| authenticateSession | To check the validity of a session |
| updateIdentity | Modifies identity details of an account |
| getDefaultPaymentForm | Fetches the default payment form for an account |
| createAccount | Creates a new account |
| modifyCustomDataDetails | To modify the custom detail of a particular or group of accounts. |
| createMerchantAccount | Creates a seller account for the secondary market |
| setDefaultShippingAddress | Stores a default address where a product shall be shipped to |
| getIdentity | Fetches a specific identity of an account |
| deleteIdentity | Marks an identity as deleted |
| logout | Logs a user out. The session gets destroyed |
| verifyPaypal | Every user account can only have a single Paypal account attached. This service starts the Paypal account verification process. |
| createIdentity | Creates a new identity for an account |
| updateDefaultPaymentForm | Modifies the setting for the default payment form |
| deleteAccount | Marks an account as deleted |
| reactivateAccount | Sets an account form deleted to active |
| findAccount | Retrieves the account details |
| getIdentities | Get a list of all identities for an account |
| findDefaultAddress | An account can have multiple addresses attached (billing, delivery address etc.). User is able to define his default address for express checkout. Method returns the default address of this particular user account. |
| createBlacklistedCreditCards | Add a credit card to a list of blacklisted credit cards. This card cannot purchase any more |
| addAddressDetails | Add address details to an account |
| getMerchantDataDetails | For secondary market: fetch merchant account details for particular user account. |
| findIdentity | Search for an identity |
| createAccountAndIdentity | Creates an account and an identity in one single shot |
| downgradeMerchant | Remove the merchant settings and migrate the merchant account to a standard account |
| deleteBlacklistedCreditCards | Removes a blacklisted credit card from the black list |
| findCreditCard | Returns the internal credit card id |
| addCreditCardDetails | Stores a credit card for an account |
| checkHandshake | To check if valid session is available |
| getAddressDetails | Returns the address details for an account |
| confirmMember | Call to authenticate and activate user account. |
| deleteCreditCardDetails | Removes a stored credit card from the system |
| modifyMerchantData | For secondary market: to modify the merchant details of a particular or group of accounts. |
| isCreditCardBlacklisted | Check if a credit card is stored in the blacklist |
| updateCredentials | Methods updates login credentials |
| handshake | Send the session id and retrieve a token to use SSO |
| createDefaultPaymentForm | Call sets default payment form for particular user (for express checkout) |
| addCreditcardDetailsToAccount | To assign a single creditcard (incl. Details) to a particular user account |
| modifyAccount | Update account information |
| getSubscriptionDetails | Retrieve all subscription details for a particular user account |
| getDefaultBillingAddress | Returns the default billing address for an account |
| deleteDefaultPaymentForm | Removes the default billing address for an account |
| upgradeMerchant | Upgrades an standard account to a merchant account for the secondary market |
| getDefaultShippingAddress | Returns the default shipping address for an account |

Admin Service

An Admin service manages client configurations. Admin Services methods are described in Table 10, below.

TABLE 10

Exemplary Admin Services Methods

| Method | Description |
| --- | --- |
| getProperty | Retrieves all client configs like payment partner details, etc. |
| setProperty | Manage all client configs. |

Admin Web Service

An Admin web service manages access to web services. Admin Web Services methods are described in Table 11, below.

TABLE 11

Exemplary Admin Web Service Methods

| Method | Description |
| --- | --- |
| createWebSecurityEntry | to create which set of external APIs can be used by which client. |
| findWebSecurityEntries | find list of external APIs per client |
| deleteWebSecurityEntry | delete right for single external APIs per client |

Customer Service

Several methods are provided for performing customer service operations and are described in Table 12, below.

TABLE 12

Exemplary Customer Service Methods

| Method | Description |
| --- | --- |
| ping | Prolong a session for a particular user account |
| login | Login a particular user |
| getAmount | Fetch the current wallet balance of a currency type per user account. |
| logout | Logout a particular user |
| creditWallet | Load the wallet with a certain amount of a certain virtual currency type for a particular or group of accounts/wallets. |
| findInventory | Find the user inventory of a particular user account. |
| findOfferDetail | Retrieve all available details of a specific offer (eg. Duration, price points, purchase type, category, description etc.) |
| getToken | Receive a token for authenticate a third party application (single sign on) |
| buyOffer | Purchase a specific offer for a particular user |
| updateWalletAndIdentityData | Attach a wallet for a particular game identity. (an user account can hold multiple identities) |

Fraud Service

Several methods are provided for performing fraud service operations and are described in Table 13, below.

TABLE 13

Exemplary Fraud Service Methods

| Method | Description |
| --- | --- |
| setFraudScore | CSR sets a new fraud score for an account |
| resetAllFraudScores | CSR resets fraud scores for all accounts |
| getFraudScore | Retrieve fraud score for an account |
| setFraudScoreHistory | Increase, decrease or reset fraud score |

Inventory Service

The inventory service is used to add or delete items from the inventory of items offered for sale and are detailed in Table 14 below.

TABLE 14

Exemplary Inventory Services Methods

| Method | Description |
| --- | --- |
| addItem | Add an item template to the inventory incl. All item related data (name, description, preconditions, restrictions etc.) |
| deleteItem | Delete an item template |

Item Service

The item service is used to create and manage item offers and some representative methods are listed in Table 15 below.

TABLE 15

Exemplary Item Services Methods

| Method | Description |
| --- | --- |
| createBundledOffer | Creates an offer which holds 1 to n offers |
| modifyOffer | Updates certain details of an offer |
| updateBundledOffer | Updates a bundled offer |
| getBundledOffer | Returns details about a bundled offer |
| reactivateOffer | Reactivate a previously deleted offer |
| updateItemTemplate | Updates a certain parameter of the item template |
| getOfferDetails | Returns the offer details of an offer |
| createEventId | Creates an event |
| evaluateMemberPurchases | Get list of all users who have purchased a particular item |
| deleteOffer | Marks an offer as deleted |
| findClassification | Find the according item classification (item, account, service, etc.) |
| createOffer | Create an offer for a particular item or bundle |
| isIdentityDeletable | Check if identity of an user account can be deleted |
| getOfferDetailsOut | Returns a specific offer |
| createItemTemplate | Creates an item template |
| updateEventId | Updates certain parameters of an event |
| findShopDetailsForPricePoint | |

Mail Service

The Mail Service delivers external email and methods associated therewith are listed below in Table 16.

TABLE 16

Exemplary Mail Services Methods

| Method | Description |
| --- | --- |
| sendExternalMail | Sends an email |

Messaging Service

Messaging services create and retrieve messages for an account or identity and some of the methods are listed below in Table 17.

TABLE 17

Exemplary Messaging Services Methods

| Method | Description |
| --- | --- |
| changeMessagesStatus | Creates a message for an account or an identity |
| getMessageCount | Retrieves the number of messages for an account or identity |
| createMessage | Create a message for an account or identity |
| getMessages | Get all messages for an account or identity |

Notification Service

The Notification Callback Web Service is an interface provided by the application system in order to receive notification of purchases made in the in-application commerce platform. Methods for this web service are listed in Table 18 below. In order to use this functionality, the application provider is required to implement and host a server offering a Notification API.

The following situation provides an example of the Notification service. Jane wants to purchase a sword for her Quest character. She visits the Quest website and selects the sword she wants. She has sufficient wallet balance, so the Quest system immediately calls the purchaseOffer method on the in-application commerce platform.

Upon successful completion of the purchase, the in-application commerce platform generates a web service call to the Quest servers to notify them of the transaction using a manually configured security key.

TABLE 18

Exemplary Notification Services Methods

| Method | Description |
| --- | --- |
| onDelivery | API to notify client about successful purchase and need for item entitlement |
| onChargeback | to notify client about chargeback for a particular offer/article |
| handshake | server to server authentication |
| checkNotificationService | check status of notification service |

Payment Provider Service

The payment provider service provides web service interfaces between the in-application commerce system and payment providers and some representative methods are listed below in Table 19.

TABLE 19

Exemplary Web Service Payment Provider Service Methods

| Method | Description |
| --- | --- |
| isChargeBackSupported | Get chargeback status |
| chargeBackPaymentTransaction | Chargeback of specific transaction |
| capturePaymentTransaction | Capture transaction |
| getSupportedCountries | Get list of supported countries for least cost routing |
| authorizePaymentTransaction | Authorize captured transaction |
| capturePaymentTransactionOnDemand | To set recurring payment |

PostPurchase Service

The PostPurchase services methods listed in Table 20 provide functionality to complete a purchase transaction, such as confirming that a virtual item purchased by one player from another has reached the purchasing player's account and delivering merchant and buyer ratings. These services are primarily used for the secondary market, completing transactions between players.

TABLE 20

Exemplary PostPurchase Services Methods

| Method | Description |
| --- | --- |
| confirmMerchantDelivery | Sends the confirmation that an item has been delivered within the secondary market |
| closeTransaction | Enforce to close an open transaction |
| getTransactionDetailDisputes | Retrieve all transaction related information for dispute ticket. |
| getRating | For secondary market: to retrieve the rating profile for a transaction |
| confirmBuyerDelivery | For secondary market: confirm the receipt of the purchased item |
| rateMerchant | For secondary market: to rate merchant for a transaction |
| getDeliverablesNotSold | For secondary market: get list of "not sold" deliverables |
| rateCustomer | Set the rating for the buyer |
| recalculateRatings | Recalculate rating for user profile |
| replyDispute | Reply on a created dispute |
| getDeliverables | Get list of all deliverables |
| deliverOffer | Mark an offer as delivered |

Web Service Reporting Service

The web service reporting service retrieves bulk data for reporting according to application requirements and some representative methods are listed in Table 21 below.

TABLE 21

Exemplary Web Service Reporting Services Methods

| Method | Description |
| --- | --- |
| getReportTableDataFile | Get data for specific table |
| getReportRenderedData | Retrieve data image |
| getReportTableData | Get data from particular table |
| getReportRenderedDataList | Retrieve multiple images |
| getReportRenderedChartNames | Get list of fetchable images |

Search Service

Search services allow searches on payments, transactions, offers, inventory, order details and player stores from the application to the in-application ecommerce system and method. Some representative methods for the search service are listed below in Table 22.

TABLE 22

Exemplary Search Services Methods

| Method | Description |
|---|---|
| findPaymentData | Find payment details |
| findTransaction | Search for transaction ids |
| findOffer | Search for offers |
| findInventory | Find inventory for particular user account |
| findOfferDetail | Find details to specific offer |
| findShop | For secondary market: find shop of a particular merchant |

Settlement Service

The platform waits 28 days before collecting the revenues from all payment enablers, in order to clear all disputes before the revenue split is cleared and settled. Players need to register their payout method (e.g. PayPal) before any revenues are shared. Table 23 below lists several settlement related methods.

TABLE 23

Exemplary Settlement Services Methods

| Method | Description |
|---|---|
| releaseTransaction | Release transaction for clearing |
| holdTransaction | Hold transaction. Transaction will not be available for clearing |
| updateStatus | Update status of settlement group |
| list | List all settlement groups |
| read | Read all transactions of settlement group |
| create | Create settlement group |
| addTransactionsFromSelection | Add transaction from selection to settlement group |
| addTransactionsBySearch | Add transaction from search result to settlement group |
| delete | Delete settlement group |
| createSettlementConfig | Create settlement configuration for particular client (revenue share calc,Payout currency, account holder, bank details, etc.) |
| getSettlementConfig | Retrieve settlement configuration for client |
| findByTransactionID | Find corresponding settlement group by transaction ID |

Subscription Service

The subscription service methods works with game subscriptions by storing and retrieving subscription status for every participant with a subscription. Some representative methods for this service are listed in Table 24 below.

TABLE 24

Exemplary Subscription Services Methods

| Method | Description |
|---|---|
| checkSubscription | Check status of subscription for particular user |
| checkSubscriptionTest | Test subscription status |

Trading Service

The Trading Service methods listed in Table 25 support the player-to-player market transactions.

TABLE 25

Exemplary Trading Service Methods

| Method | Description |
|---|---|
| transactionsForClearing | Set finished transactions to cleared |
| clearedTransactions | Get list of cleared transactions |
| findTransactions | Find transaction |
| updatePaymentTransaction | Update transaction status |
| find PaymentTransactionByTransactionID | Retrieve transaction by transaction ID |
| createPaymentTransaction | Create a transaction |
| validateTransaction | Set particular transaction from finished to validated |

Wallet Service

The Wallet Service with the methods listed in Table 26 is used to directly manage a user's wallet balances. The wallet balance is updated whenever a purchase is made using the storefront web services. This service is used for when you wish to directly manage a customer's balances. For example, to provide bonus points for referring a friend. SSL is required by the interface unless some other network level encryption or private connection is in place.

TABLE 26

Exemplary Wallet Service Methods

| Method | Description |
|---|---|
| findWalletTransaction | Retrieves details to a single or multiple wallet transactions for a particular user account and currency type. |
| updateWalletTransactionExternal | Enables client to update any external params fields for a certain transaction. |
| getAmount | Returns the amount of virtual currency stored in the wallet for an account or identity |
| createTransaction | To create a transaction for a certain offer and user account |
| getBillingAddress | Returns the billing address for an account |
| reserveAmount | Reserve an amount (user is not able to spend amount until the amount is settled) |
| findWalletTrxExternal | Find external wallet transaction |
| findTransactions | Find internal wallet transaction |
| creditWallets | Updates 1 to n wallets with one api call. |
| setAccountOnWalletTrxExternal | |
| settleAmount | Settle reserved amount |
| setBillingAddress | Set billing address for transaction and user. |
| creditWallet | Add points to a wallet for an account or identity |
| updateFromAccountDefaultSettings | Update shadow account settings if master account is hold by client. |
| authorize | Authorize a reserved amount (for asynchronous credit card transactions) |
| getAmountDecimal | Returns the wallet amount as decimal |

TABLE 26-continued

Exemplary Wallet Service Methods

| Method | Description |
| --- | --- |
| addCreditCardDetails2WalletTransaction | Add credit card details to wallet for authorization |
| getBalances | Retrieve the balance of a certain wallet/currency type for a particular user account. |
| debitWallets | Deduct an amount from 1 to n wallets |
| cancelAmount | Cancel certain amount. |
| getTransactionDetail | Retrieve details for a particular transaction |
| debitWallet | Deduct an amount from one wallet |
| getWalletIdForAccount | Get list of wallet Ids for a certain user account. |

Internal APIs

Internal APIs communicate data among modules. Following in Table 27 is a list of internal APIs used in a preferred embodiment of an in application commerce system and method.

TABLE 27

Exemplary Internal APIs

| API | Purpose |
| --- | --- |
| AccountServiceInternal | Create, Read, Update and Delete account service details |
| BaseClientConfigServiceInternal | Get the configuration for a certain client |
| BasketServiceInternal | Service for an article added to a basket |
| BatchServiceInternal | This service gets the status or starts a batch run. |
| BulkUploadServiceInternal | Bulk Upload of article inventory and offer management. |
| CipherServiceInternal | For security encapsuling (SHA1) |
| ClientCreatorServiceInternal | Create configuration of client (currencies, payment forms, etc.) |
| CloudServiceInternal | Calculate content for cloud (web 2.0) shop UI |
| ComponentServiceInternal | Retrieve information about shop layout (panels, pages) |
| CountryTaxClassificationServiceInternal | Retrieve correct tax calculation for transaction |
| CouponServiceInternal | Generates coupons |
| CurrencyRateClientInternal | Retrieve exchanges rates for multiple currencies |
| CurrencyServiceInternal | Retrieve and manage the list of supported currencies per client. |
| DemographicServiceInternal | Calculate demographical profile of users. |
| DisputeServiceInternal | Create, Read, Update and Delete dispute request |
| ExchangeRateServiceInternal | Define exchange rates among multiple virtual currencies |
| FraudDataProviderInternal | Retrieve fraud data from payment partner |
| FraudDetectionServiceInternal | Service to calculate fraud scoring for all users |
| FraudServiceInternal | Manages fraud for all users |
| WalletServiceInternal | Load, reserve, debit and refund virtual currencies per wallet. |
| ICreditCardPaymentProvider | Execute credit card payments |
| ICurrency | Currency object |
| IFatfoogooFeeService | Get fatfoogoo revenue fees based on client configuration |

TABLE 27-continued

Exemplary Internal APIs

| API | Purpose |
| --- | --- |
| InventoryServiceInternal | Manage the shop inventory |
| IPaymentCallback | Enable refunds |
| Item BasketServiceInternal | Manage items within basket |
| ItemServiceInternal | Create, Read, Update and Delete pricepoints for items. |
| LinkCreatorInternal | Batch and wicket creator for links |
| LinkServiceInternal | Wicket links |
| MailServiceInternal | Send out external messages |
| MessageServiceInternal | Send and receive internal messages |
| NotificationRetryServiceInternal | Retry notification calls towards client if first failed |
| PaymentFormServiceInternal | Retrieve all payment option for transaction and user |
| PaymentProvider | Interface with all payment partners |
| PaymentServiceInternal | Fetch valid payment provider for payment form |
| PayoutTransactionServiceInternal | Calculate payouts per client |
| Pending PaymentServiceInternal | Manages pending payment statuses (from Paypal) |
| PostPurchaseServiceInternal | Manage all post payment related processes |
| PricePointServiceInternal | Get correct price point per offer |
| ReminderServiceInternal | Remind merchants of secondary market to deliver articles. |
| SessionServiceInternal | Retrieve and validate sessions |
| SiteServiceInternal | All information about a single shop webpage within the commerce system |
| SiteSessionInfoServiceInternal | Retrieve information about clickpath |
| SubscriptionServiceInternal | Manage subscriptions |
| TaxServiceProviderInternal | Retrieve taxation schedule |
| TicketServiceInternal | Manage customer care tickets |
| Transaction HistoryServiceInternal | Retrieve and check transaction histories |

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular provider systems used, such that different communication protocols may be organized or designed differently while maintaining substantially the same functionality and without departing from the scope and spirit of the present invention.

What is claimed is:

1. An in-application fraud prevention, management and control system comprising:
 a web application server comprising a network communication device, a processor and a memory, the memory having executable instructions stored thereon and executed by the processor, the executable instructions configured to access a database of administrator-defined and configured user behavior events specific to an internet-accessible on-line application and indicating fraudulent behavior, the executable instructions further configured to allow a user to access and interact with the internet-accessible on-line application stored in memory while the system performs user behavior tracking for the configured events;
 an e-commerce transaction server providing in-application purchasing, operatively connected to the web application server through the network communication device, comprising a processor and a memory and further comprising:

an account management module containing program code stored in memory which when executed by the processor in the e-commerce transaction server causes the e-commerce transaction server to perform the operations of managing a user account, the user account comprising a fraud score which is a sum of fraud points or a user wallet with a personal threshold for making in-application purchases;

a communications module containing program code stored in memory which when executed by the processor in the e-commerce transaction server causes the e-commerce transaction server to receive event messages from third party systems comprising offer companies, payment providers or technology firms or other applications with which the user's user wallet has been integrated; from the on-line application; and from within the e-commerce system;

a fraud defender module containing program code stored in memory which when executed by the processor in the e-commerce transaction server causes the e-commerce transaction server to perform a method of:

determining a risk classification applicable to the user;
assigning positive or negative fraud points based on customer-specified, configurable rules defining the events to utilize in generating a fraud score, the rules stored in a fraud database and applied to the event messages received at the communications module via batch and messaging frameworks and associated with particular user behavior occurring in the on-line application, third party systems with which the user wallet has been integrated, or from within the e-commerce system;
updating the fraud score for the user account based on the assigned fraud points in near real time; and
applying application fraud controls in near real time to limit the features available to users within the risk classification, for subsequent user transactions, in response to the updated fraud score and the risk classification, the controls applied to at least one of the following application features available to the user: (i) offers, (ii) allowed payment types and (iii) reverse wallet thresholds, the application fraud controls changable in near real time as the user interacts with the internet-accessible on-line application.

2. The in-application fraud prevention, management and control system of claim 1 wherein the internet-accessible on-line application comprises a game application and wherein event messages received at the communications module comprise at least game play and game commerce events.

3. The in-application fraud prevention, management and control system of claim 1 wherein the particular user behavior occurring in the internet-accessible on-line application comprises adding a new friend within the on-line application such that one of the fraud events comprises assigning negative fraud points to the user account when a received event message indicates that a new friend was added within the on-line application.

4. The in-application fraud prevention, management and control system of claim 1 wherein the particular user behavior occurring in the internet-accessible on-line application comprises accumulated actions over time within the internet-accessible on-line application such that one of the fraud events comprises assigning negative fraud points to the user account when a received event message indicates that the particular user has accumulated actions over time within the internet-accessible on-line application.

5. The in-application fraud prevention, management and control system of claim 1 wherein the particular user behavior occurring in the internet-accessible on-line application comprises a past suspension from the internet-accessible on-line application such that one of the fraud events comprises assigning negative fraud points to the user account when a received event message indicates that a reactivated user was previously suspended from the internet-accessible on-line application.

6. The in-application fraud prevention, management and control system of claim 1 wherein the particular user behavior occurring in the internet-accessible on-line application comprises a suspension from the internet-accessible on-line application such that one of the fraud events comprises assigning positive fraud points to the user account when a received event message indicates that a user was suspended from the internet-accessible on-line application.

7. The in-application fraud prevention, management and control system of claim 1 wherein the particular user behavior occurring in the internet-accessible on-line application comprises a disputes to total purchases ratio such that one of the fraud events comprises assigning positive fraud points to the user account when a received event message indicates that a user has dispute to total purchases ratio that indicates a higher risk than other users of the internet-accessible on-line application.

8. The in-application fraud prevention, management and control system of claim 1 wherein the particular user behavior occurring in the internet-accessible on-line application comprises a chargebacks to disputes ratio such that one of the fraud events comprises assigning positive fraud points to the user account when a received event message indicates that a user has a chargebacks to dispute ratio that indicates a higher risk than other users of the internet-accessible on-line application.

9. The in-application fraud prevention, management and control system of claim 1 wherein the fraud defender module contains program code stored in memory which when executed by the processor in the server causes the server to assign negative fraud points to the user account when a commerce event indicates a successful transaction occurring in the wallet.

10. The in-application fraud prevention, management and control system of claim 1 wherein the fraud defender module contains program code stored in memory which when executed by the processor in the server causes the server to: (i) receive a third party payment partners error response associated with a transaction on the user account and (ii) assign fraud points to the user account based on the received error response.

11. The in-application fraud prevention, management and control system of claim 1 wherein the fraud defender module contains program code stored in memory which when executed by the processor in the server causes the server to assign a particular risk class to the user account based on the fraud score and to limit the user account based on the assigned risk class to a limited number of particular payment forms.

12. The in-application fraud prevention, management and control system of claim 1 wherein the fraud defender module contains program code stored in memory which when executed by the processor in the server causes the server to assign a particular risk class to the user account based on the fraud score and to limit the user account based on the assigned risk class to a particular user role.

13. The in-application e-commerce system of claim 1 wherein the user account further comprises a wallet with a personal threshold for spending that the user is allowed to spend in advance before the system clears the wallet and wherein the fraud defender module contains program code stored in memory which when executed by the processor in the server causes the server to update the personal threshold based on changes to the fraud score for the user account.

14. The in-application e-commerce system of claim 13 further comprising a wallet module containing program code stored in memory which when executed by the processor in the server causes the server to: (i) receive a transaction request with an amount for a micropayment on a shopper order in the in-application e-commerce system, and (ii) debit the wallet based on a determining that the received transaction request amount is below the personal threshold.

15. The in-application e-commerce system of claim 13 further comprising a wallet module containing program code stored in memory which when executed by the processor in the server causes the server to: (i) receive a transaction request with an amount for a micropayment on a shopper order in the in-application e-commerce system, and (ii) notify the user that the personal threshold would be exceeded based on a determining that the received transaction request amount is above the personal threshold.

16. The in-application e-commerce system of claim 15 wherein the wallet module contains program code stored in memory which when executed by the processor in the server causes the server to load the wallet with an amount that exceeds the personal threshold based upon the user responding to a notification that the personal threshold would be exceeded.

17. The in-application e-commerce system of claim 13 further comprising a wallet module containing program code stored in memory which when executed by the processor in the server causes the server to clear the wallet once spending in the wallet has exceeded the personal threshold.

18. The in-application e-commerce system of claim 1 further comprising updating the risk classification applicable to the user in near real time as the user interacts with the internet-accessible on-line application in response to events communicated by the communications.

19. A method for managing the risk of fraudulent transactions performed by users of an internet application stored and processed on a web application server, the internet application operatively connected to an in-application e-commerce system transaction server and third-party systems, the method comprising steps of:
maintaining a user account in the e-commerce system transaction server, the user account comprising a wallet for making in-application purchases and a fraud score which is a sum of fraud points;
receiving event messages through the network, wherein event messages related to user behavior tracked as the user interacts with the internet application, from the internet application, third-party systems with which the user's wallet is integrated, or the in-application e-commerce system for a user associated with the user account;
assigning positive or negative fraud points based on the received event messages associated with particular user behavior occurring in the internet application, third-party systems or the in-application e-commerce system;
updating the fraud score for the user account based the assigned fraud points in near real time;
determining a risk classification based on the assigned fraud points; and
applying fraud controls in near real time to limit the features of the internet application available to users within a risk classification, for the user's subsequent interaction with the internet application based on the user's updated fraud score and risk classification, where the controls are applied to at least one of the following features available to the user: (i) offers, (ii) allowed payment types and (iii) reverse wallet thresholds, the fraud controls changable in near real time as the user interacts with the internet application.

20. The method of claim 19 wherein the particular user behavior occurring in the internet application comprises adding a new friend within the on-line application and wherein the assigning step comprises assigning negative fraud points to the user account when a received event message indicates that a new friend was added within the internet application.

21. The method of claim 19 wherein the particular user behavior occurring in the internet application comprises accumulated actions over time within the internet application and wherein the assigning step comprises assigning negative fraud points to the user account when a received event message indicates that the particular user has accumulated actions over time within the internet application.

22. The method of claim 19 wherein the particular user behavior occurring in the internet application comprises a past suspension from the internet application and wherein the assigning step comprises assigning negative fraud points to the user account when a received event message indicates that a reactivated user was previously suspended from the internet application.

23. The method of claim 19 wherein the particular user behavior occurring in the internet application comprises a suspension from the internet application and wherein the assigning step comprises assigning positive fraud points to the user account when a received event message indicates that a user was suspended from the internet application.

24. The method of claim 19 wherein the particular user behavior occurring in the internet application comprises a disputes to total purchases ratio and wherein the assigning step comprises assigning positive fraud points to the user account when a received event message indicates that a user has dispute to total purchases ratio that indicates a higher risk than other users of the internet application.

25. The method of claim 19 wherein the particular user behavior occurring in the internet application comprises a chargebacks to disputes ratio and wherein the assigning step comprises assigning positive fraud points to the user account when a received event message indicates that a user has a chargebacks to dispute ratio that indicates a higher risk than other users of the internet application.

26. The method of claim 19 the user account further comprises a wallet and wherein the assigning step comprises assigning negative fraud points to the user account when a commerce event indicates a successful transaction occurs in the wallet.

27. The method of claim 19 the user account further comprising a step of receiving a third party payment partners error response associated with a transaction on the user account and wherein the assigning step comprises assigning negative fraud points to the user account based on the received error response.

28. The method of claim 19 the user account further comprising a step of assigning a particular risk class to the user account based on the fraud score.

29. The method of claim 28 the user account further comprising a step of limiting the user account based on the assigned risk class to a limited number of particular payment forms.

30. The method of claim 28 the user account further comprising a step of limiting the user account based on the assigned risk class to a particular user role.

31. The method of claim 28 the user account further comprising a step of limiting the user account based on the assigned risk class to one of: wallet transaction limits, particular storefront offers, and particular content available in the internet application.

32. The method of claim 19 wherein the user account further comprises a wallet with a personal threshold for spending that the user is allowed to spend in advance before the system clears the wallet and further comprising a step of updating the personal threshold based on changes to the fraud score for the user account.

33. The method of claim 32 further comprising steps of:
receiving a transaction request with an amount for a micropayment on a shopper order in the in-application e-commerce system; and
debiting the wallet based on a determining that the received transaction request amount is below the personal threshold.

34. The method of claim 32 further comprising steps of:
receiving a transaction request with an amount for a micropayment on a shopper order in the in-application e-commerce system; and
notifying the user that the personal threshold would be exceeded based on a determining that the received transaction request amount is above the personal threshold.

35. The method of claim 34 further comprising a step of loading the wallet with an amount that exceeds the personal threshold based upon the user responding to a notification that the personal threshold would be exceeded.

36. The method of claim 32 further comprising a step of clearing the wallet once spending in the wallet has exceeded the personal threshold.

* * * * *